US012597282B2

(12) United States Patent
Miyauchi

(10) Patent No.: US 12,597,282 B2
(45) Date of Patent: Apr. 7, 2026

(54) IMAGE PROCESSING APPARATUS, CONTROL METHOD OF IMAGE PROCESSING APPARATUS, AND STORAGE MEDIUM

(71) Applicant: CANON KABUSHIKI KAISHA, Tokyo (JP)

(72) Inventor: Takashi Miyauchi, Inagi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 508 days.

(21) Appl. No.: 18/179,816

(22) Filed: Mar. 7, 2023

(65) Prior Publication Data

US 2023/0206672 A1 Jun. 29, 2023

Related U.S. Application Data

(63) Continuation of application No. 17/032,083, filed on Sep. 25, 2020, now Pat. No. 11,620,844.

(30) Foreign Application Priority Data

Sep. 30, 2019 (JP) ................................. 2019-179738

(51) Int. Cl.
*G06V 30/412* (2022.01)
*G06V 30/418* (2022.01)
*G06V 30/10* (2022.01)

(52) U.S. Cl.
CPC .......... *G06V 30/412* (2022.01); *G06V 30/418* (2022.01); *G06V 30/10* (2022.01)

(58) Field of Classification Search
None
See application file for complete search history.

(56) References Cited

U.S. PATENT DOCUMENTS 5,251,273 A * 10/1993 Betts ..................... G06V 30/127
382/311
5,509,092 A * 4/1996 Hirayama ............ G06V 10/987
382/177
(Continued)

FOREIGN PATENT DOCUMENTS

JP 2004213304 A 7/2004
JP 2005275849 A 10/2005
(Continued)

OTHER PUBLICATIONS

Office Action issued in U.S. Appl. No. 17/032,083 mailed Aug. 4, 2022.

(Continued)

*Primary Examiner* — Anand P Bhatnagar
(74) *Attorney, Agent, or Firm* — ROSSI, KIMMS & McDOWELL LLP

(57) ABSTRACT

An image processing apparatus according to an aspect of the present disclosure includes an optical character recognition (OCR) unit configured to sequentially execute processing related to OCR on image data on a plurality of documents, a generation unit configured to select one of the plurality of documents subjected to the processing related to OCR, and to generate a recommendation content about an index to be assigned to the one selected document based on an index extraction rule, and a confirmation unit configured to present the generated recommendation content to a user and to assign an index to the one document based on an instruction from the user. The processing to be executed by the OCR unit and processing to be executed by the confirmation unit are executed in parallel.

44 Claims, 19 Drawing Sheets

(56)                References Cited

U.S. PATENT DOCUMENTS

| | | | | |
|---|---|---|---|---|
| 6,038,342 | A * | 3/2000 | Bernzott | G06F 18/28 |
| | | | | 382/173 |
| 6,351,560 | B1 * | 2/2002 | Hashimoto | G06V 30/1444 |
| | | | | 382/176 |
| 6,738,780 | B2 * | 5/2004 | Lawrence | G06F 16/382 |
| | | | | 707/999.005 |
| 8,176,004 | B2 * | 5/2012 | Malaney | G06Q 10/00 |
| | | | | 709/219 |
| 8,730,548 | B2 * | 5/2014 | Tani | H04N 1/0035 |
| | | | | 399/85 |
| 8,990,235 | B2 * | 3/2015 | King | G06F 40/197 |
| | | | | 707/769 |
| 9,454,545 | B2 * | 9/2016 | Reese | G06F 16/5838 |
| 9,588,971 | B2 * | 3/2017 | Hartmann | G06F 16/93 |
| 2003/0042319 | A1 * | 3/2003 | Moore | G06V 30/416 |
| | | | | 235/494 |
| 2008/0147790 | A1 * | 6/2008 | Malaney | G06Q 10/00 |
| | | | | 709/203 |
| 2009/0282492 | A1 * | 11/2009 | Takahashi | G06F 21/6218 |
| | | | | 715/255 |
| 2015/0302277 | A1 | 10/2015 | Suzuki | |
| 2018/0082154 | A1 * | 3/2018 | Kalyuzhny | G06F 18/2178 |
| 2018/0218208 | A1 * | 8/2018 | Arakawa | G06V 10/7788 |

FOREIGN PATENT DOCUMENTS

| | | |
|---|---|---|
| JP | 2011015348 A | 1/2011 |
| JP | 2012064195 A | 3/2012 |
| JP | 2015215878 A | 12/2015 |
| JP | 2018124656 A | 8/2018 |
| JP | 7379051 B2 | 11/2023 |

OTHER PUBLICATIONS

Notice of Allowance issued in U.S. Appl. No. 17/032,083 mailed Dec. 7, 2022.

* cited by examiner

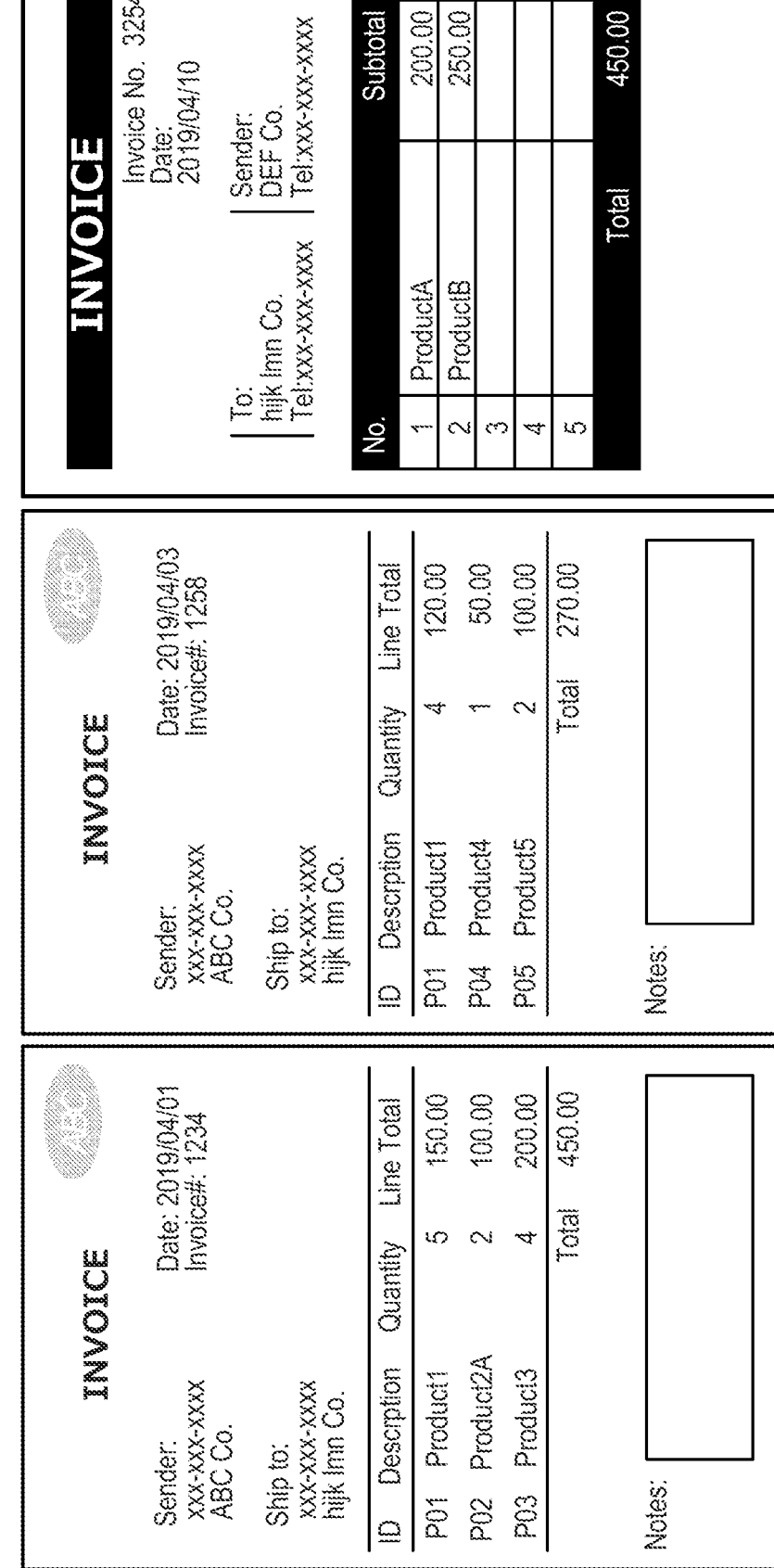

FIG. 8A

INVOICE

Sender:
xxx-xxx-xxxx
ABC Co.

Ship to:
xxx-xxx-xxxx
hijk lmn Co.

Date: 2019/04/01
Invoice#: 1234

| ID | Description | Quantity | Line Total |
|----|-------------|----------|------------|
| P01 | Product1 | 5 | 150.00 |
| P02 | Product2A | 2 | 100.00 |
| P03 | Product3 | 4 | 200.00 |
| | | Total | 450.00 |

Notes:

FIG. 8B

INVOICE

Sender:
xxx-xxx-xxxx
ABC Co.

Ship to:
xxx-xxx-xxxx
hijk lmn Co.

Date: 2019/04/03
Invoice#: 1258

| ID | Description | Quantity | Line Total |
|----|-------------|----------|------------|
| P01 | Product1 | 4 | 120.00 |
| P04 | Product4 | 1 | 50.00 |
| P05 | Product5 | 2 | 100.00 |
| | | Total | 270.00 |

Notes:

FIG. 8C

INVOICE

Invoice No. 3254
Date:
2019/04/10

To:
hijk lmn Co.
Tel:xxx-xxx-xxxx

Sender:
DEF Co.
Tel:xxx-xxx-xxxx

| No. | | Subtotal |
|-----|--|----------|
| 1 | ProductA | 200.00 |
| 2 | ProductB | 250.00 |
| 3 | | |
| 4 | | |
| 5 | | |
| | Total | 450.00 |

FIG. 9A

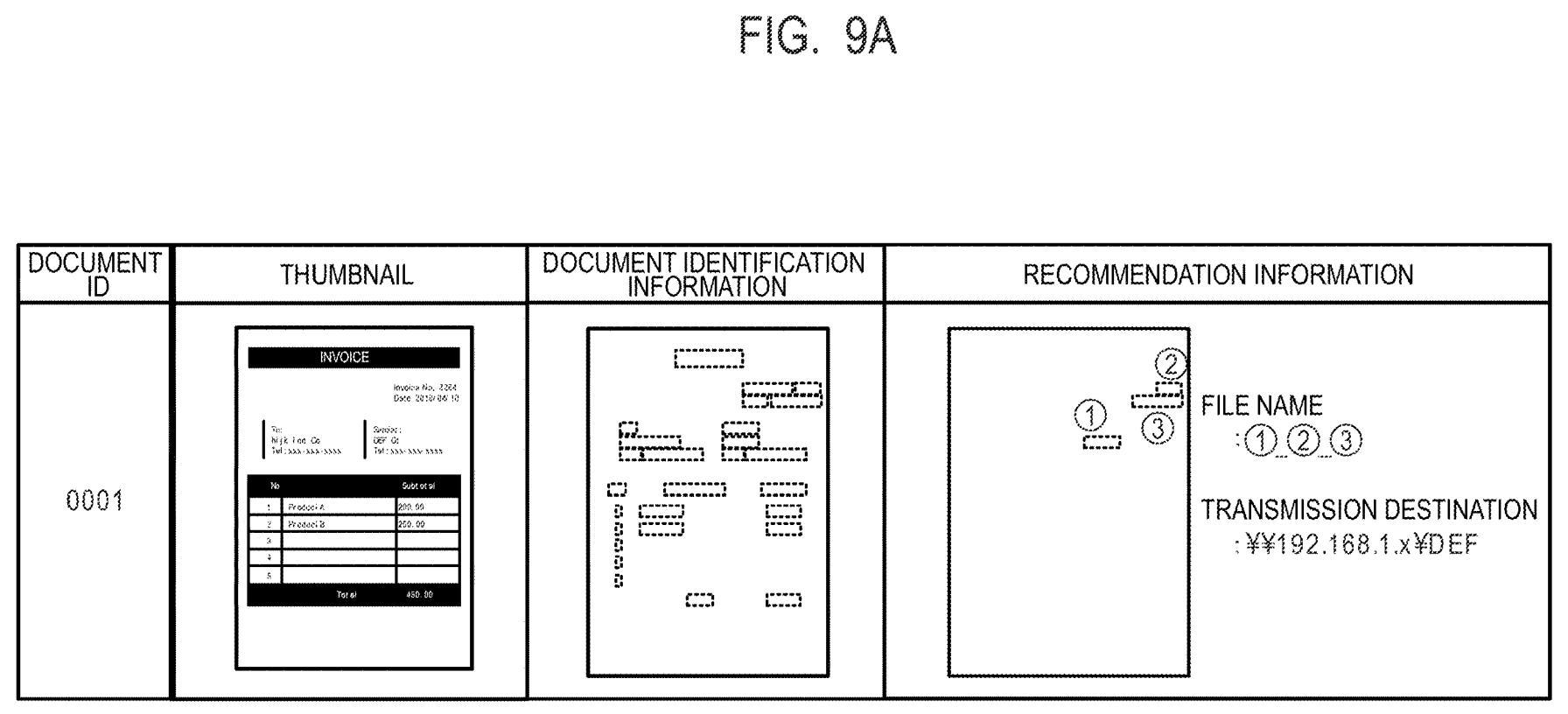

| DOCUMENT ID | THUMBNAIL | DOCUMENT IDENTIFICATION INFORMATION | RECOMMENDATION INFORMATION |
|---|---|---|---|
| 0001 | | | FILE NAME ①_②_③<br><br>TRANSMISSION DESTINATION ¥¥192.168.1.x¥DEF |

FIG. 9B

| DOCUMENT ID | THUMBNAIL | DOCUMENT IDENTIFICATION INFORMATION | RECOMMENDATION INFORMATION |
|---|---|---|---|
| 0001 | | | FILE NAME : ① ② ③<br>TRANSMISSION DESTINATION :¥¥192.168.1.x¥DEF |
| 0002 | | | FILE NAME : ① ② ③<br>TRANSMISSION DESTINATION :¥¥192.168.1.x¥ABC |

FIG. 13

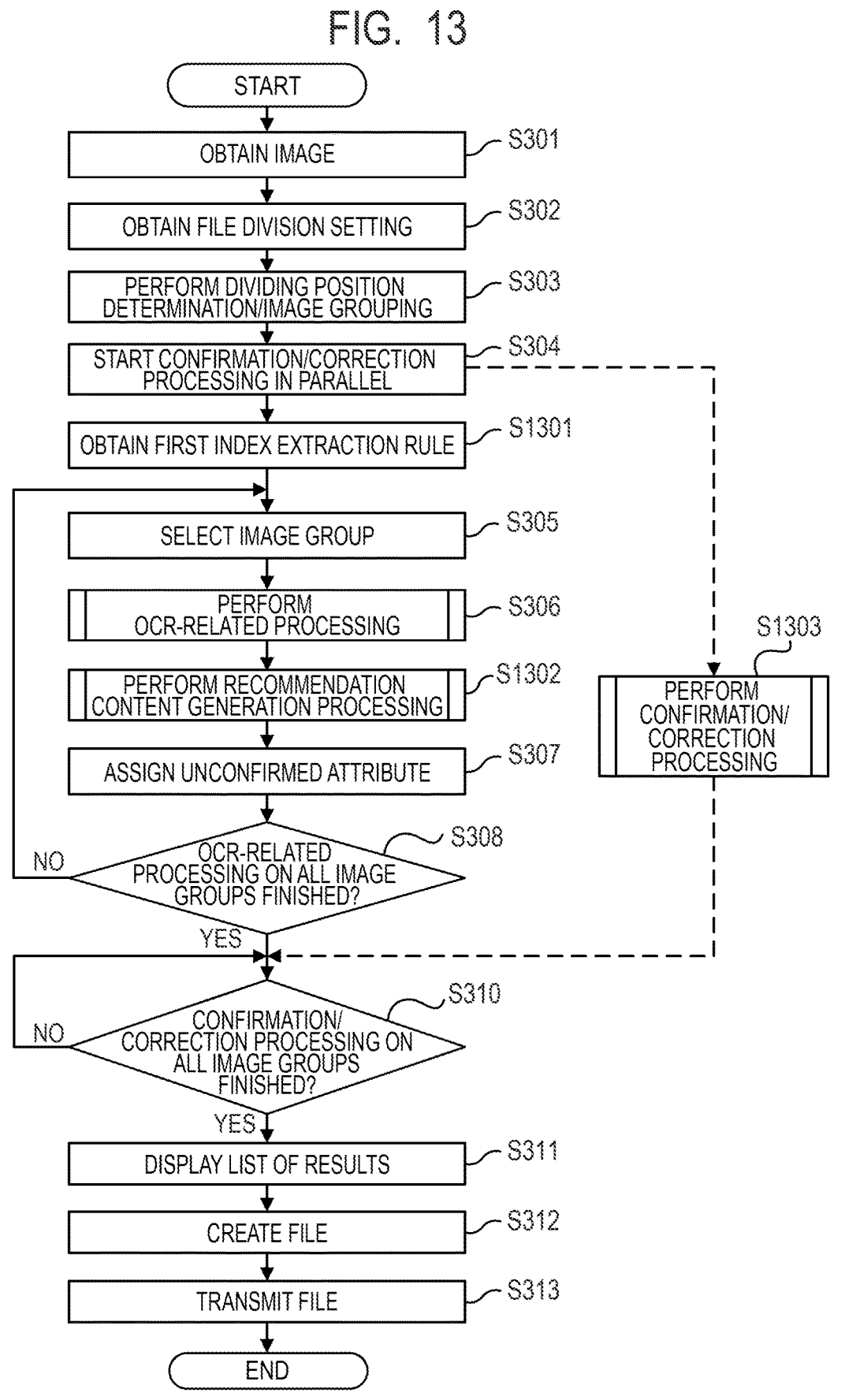

START

OBTAIN IMAGE — S301

OBTAIN FILE DIVISION SETTING — S302

PERFORM DIVIDING POSITION DETERMINATION/IMAGE GROUPING — S303

START CONFIRMATION/CORRECTION PROCESSING IN PARALLEL — S304

OBTAIN FIRST INDEX EXTRACTION RULE — S1301

SELECT IMAGE GROUP — S305

PERFORM OCR-RELATED PROCESSING — S306

PERFORM RECOMMENDATION CONTENT GENERATION PROCESSING — S1302

ASSIGN UNCONFIRMED ATTRIBUTE — S307

OCR-RELATED PROCESSING ON ALL IMAGE GROUPS FINISHED? — S308

NO

S1303

PERFORM CONFIRMATION/ CORRECTION PROCESSING

YES

CONFIRMATION/ CORRECTION PROCESSING ON ALL IMAGE GROUPS FINISHED? — S310

NO

YES

DISPLAY LIST OF RESULTS — S311

CREATE FILE — S312

TRANSMIT FILE — S313

END

FIG. 15A

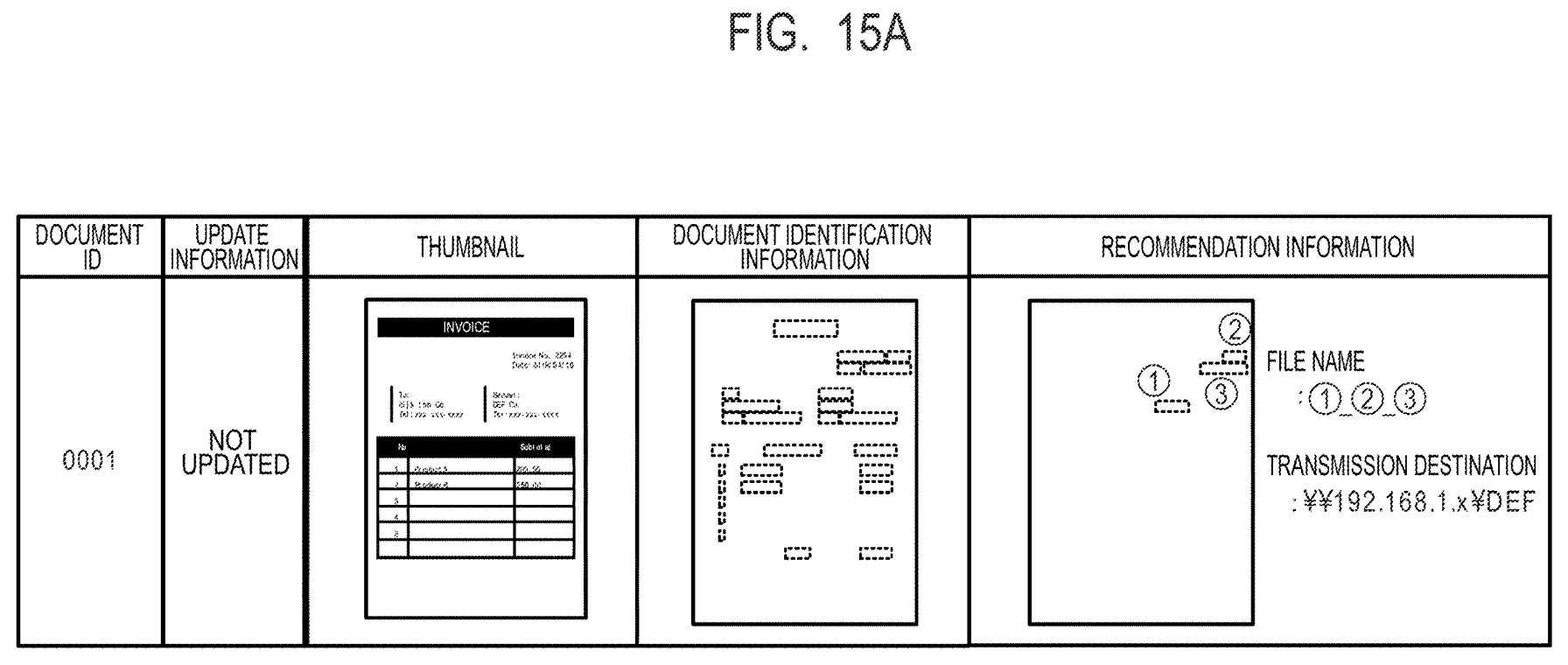

| DOCUMENT ID | UPDATE INFORMATION | THUMBNAIL | DOCUMENT IDENTIFICATION INFORMATION | RECOMMENDATION INFORMATION |
|---|---|---|---|---|
| 0001 | NOT UPDATED | | | FILE NAME : ①_②_③ <br> TRANSMISSION DESTINATION : ¥¥192.168.1.x¥DEF |

FIG. 15B

| DOCUMENT ID | UPDATE INFORMATION | THUMBNAIL | DOCUMENT IDENTIFICATION INFORMATION | RECOMMENDATION INFORMATION |
|---|---|---|---|---|
| 0001 | NOT UPDATED | | | FILE NAME : ①_②_③<br>TRANSMISSION DESTINATION :¥¥192.168.1.x¥DEF |
| 0002 | NEW | | | FILE NAME : ①_②_③<br>TRANSMISSION DESTINATION :¥¥192.168.1.x¥ABC |

IMAGE PROCESSING APPARATUS, CONTROL METHOD OF IMAGE PROCESSING APPARATUS, AND STORAGE MEDIUM

BACKGROUND

Field

The present disclosure relates to an image processing apparatus including a function of file division when a plurality of documents is scanned, and making a recommendation such as a file name for each document, a method of controlling the image processing apparatus, and a storage medium storing the method.

Description of the Related Art

A work flow in which a paper document, such as a business form, is scanned by an image scanning apparatus and scanned data is converted into digital data is known. In this case, in general, a file name or meta-information is assigned to a digital document image depending on the type and content of each document, and the information is stored in a predetermined folder. In this case, manual operation for file name assignment, meta-information assignment, and designation of folders of transmission destination increases a user's work load as the number of paper documents to be digitized increases. In a multi-function peripheral (MFP) in particular, if there is a need to input a file name or meta-information using a software keyboard due to constraints of a user interface (UI), the user's work load increases. In addition, if there is a need to create a new folder during designation of a transmission destination, the user's work load increases.

In Japanese Patent Application Laid-Open No. 2011-15348, a document type is associated with index extraction rules, such as a file name assignment rule, a meta-information assignment rule, and a transmission destination rule, and the associated information is preliminarily registered. Next, when documents of the same type are scanned, the type of each document is recognized, and a file name, meta-information, and a transmission destination are automatically determined using the associated index extraction rules, and the determined file name, meta-information, and transmission destination are recommended to the user. With this configuration, the user's work load can be considerably reduced.

In addition, a technique discussed in Japanese Patent Application Laid-Open No. 2018-124656 provides not only the recommendation processing for each registered document, but also a confirmation UI for correcting a recommendation result and receiving an unregistered document naming operation by a user. This technique enables automatic learning of index extraction rules only by repeatedly performing a naming operation and a correction operation by the user, without performing initial settings for the index extraction rules.

On the other hand, there is a demand for scanning a plurality of documents at once, dividing the documents into different files, and recommending a file name, meta-information, and a transmission destination for each file. However, it is difficult to achieve the recommendation for a plurality of files while automatically learning index extraction rules, as in the technique discussed in Japanese Patent Application Laid-Open No. 2018-124656. For example, in a case where a series of processing from the recommendation to the reception of a confirmation result from the user through a UI is repeated by a number of times corresponding to the number of files as discussed in Japanese Patent Application Laid-Open No. 2018-124656, a waiting time corresponding to a processing time required for the recommendation occurs every time before confirmation of each file. In addition, in a case where image processing for the recommendation is executed first at a back end of the confirmation operation by the user so as to reduce the waiting time, it is difficult to apply newly registered index extraction rules to other documents in the same scanning process on the spot. In this case, even if unregistered documents of the same type, or documents of the same type for which the index extraction rules need to be changed are included in the same scanning process, there is a need to repeatedly perform the same operation, which takes a great deal of time and labor for the user.

SUMMARY

An image processing apparatus according to an aspect of the present disclosure comprises an optical character recognition (OCR) unit configured to sequentially execute processing related to OCR on image data on a plurality of documents, a generation unit configured to select one of the plurality of documents subjected to the processing related to OCR, and to generate a recommendation content about an index to be assigned to the one selected document based on an index extraction rule, and a confirmation unit configured to present the generated recommendation content to a user and to assign an index to the one document based on an instruction from the user, wherein the processing to be executed by the OCR unit and processing to be executed by the confirmation unit are executed in parallel.

Further features of the present disclosure will become apparent from the following description of exemplary embodiments with reference to the attached drawings.

BRIEF DESCRIPTION OF THE DRAWINGS

FIG. 8A illustrates an example of an image of a top page after file division according to the exemplary embodiment.

FIG. 8B illustrates an example of the image of the top page after file division according to the exemplary embodiment.

FIG. 8C illustrates an example of the image of the top page after file division according to the exemplary embodiment.

FIG. 9A illustrates an example of an index extraction rule according to the exemplary embodiment.

FIG. 9B illustrates an example of the index extraction rule according to the exemplary embodiment.

FIG. 13 is a flowchart illustrating a processing procedure according to another exemplary embodiment.

FIG. 15A illustrates a second index extraction rule according to still one more exemplary embodiment.

FIG. 15B illustrates the second index extraction rule according to still one more exemplary embodiment.

DESCRIPTION OF THE EMBODIMENTS

Preferred embodiments of the present invention will now be described in detail in accordance with the accompanying drawings.

Exemplary embodiments of the present invention will be described in detail below with reference to the accompanying drawings. The following exemplary embodiments are not meant to limit the scope of the present invention as encompassed by the appended claims. Further, not all combinations of features described in the exemplary embodiments are essential for solving means of the present invention.

First Exemplary Embodiment

System Configuration

Figure 1:
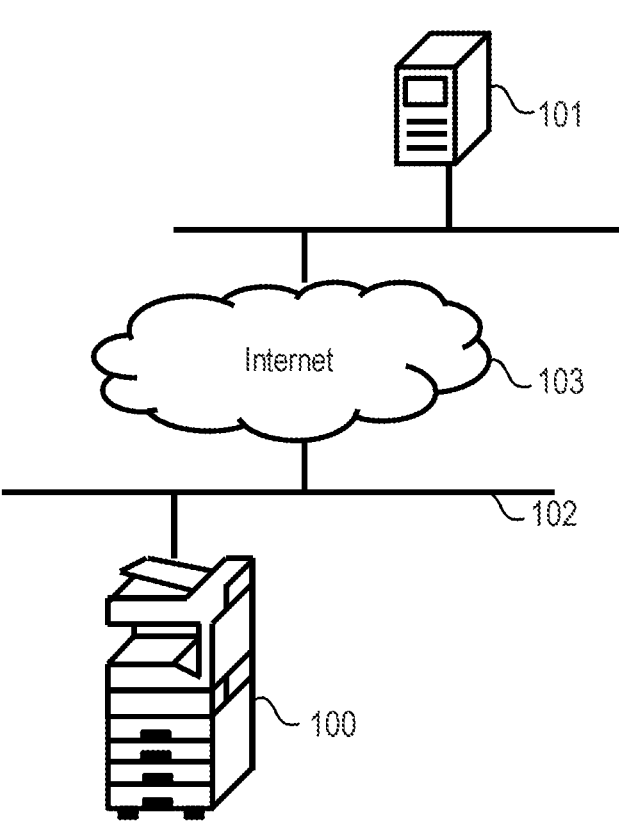
FIG. 1 illustrates an overall configuration of a system according to an exemplary embodiment.

FIG. 1 illustrates an overall configuration of a system to which an exemplary embodiment of the present disclosure can be applied. As illustrated in FIG. 1, an image processing apparatus 100 is connected to a local area network (LAN) 102, and can communicate with a terminal 101, such as a personal computer (PC) via the Internet 103 or the like. To implement the present exemplary embodiment, the terminal 101, such as a PC, need not necessarily be provided, and only the image processing apparatus 100 may be used.

The image processing apparatus 100 is, for example, a multi-function peripheral (MFP) including a display/operation unit, a scanner unit, and a printer unit. The image processing apparatus 100 can be used as a scanning terminal that uses the scanner unit to scan a document. The image processing apparatus 100 also includes a display/operation unit, such as a touch panel and hardware buttons, to display a file name and a recommendation result of a storage destination and to display a user interface for receiving an instruction from a user. The present exemplary embodiment illustrates an example where scanning processing, file division processing, OCR-related processing, recommendation content generation processing, and file transmission are executed singly by the image processing apparatus 100. Alternatively, a system configured such that a part of the above-described processing is executed by another terminal 101 may also be used. For example, scanning processing and file division processing may be first executed by the image processing apparatus 100, and a scanned image may be transmitted to the other terminal 101 via a network. Further, OCR-related processing and recommendation content generation processing may be executed by the other terminal 101 and a recommendation result may be sent to the image processing apparatus 100, and then the image processing apparatus 100 may generate a file and transmit the generated file.

Hardware Configuration of Image Processing Apparatus

Figure 2:
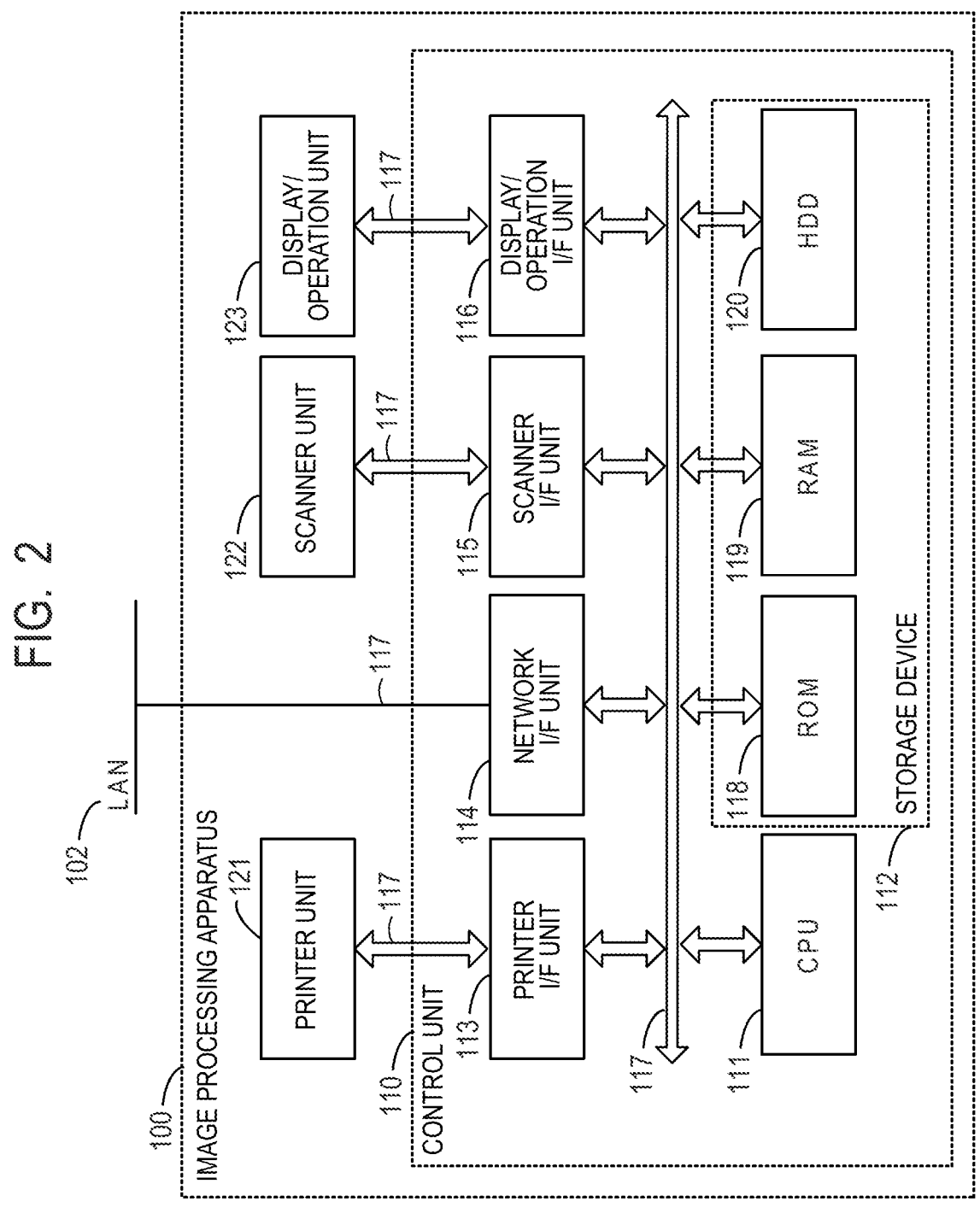
FIG. 2 is a block diagram illustrating a hardware configuration of an image processing apparatus according to the exemplary embodiment.

FIG. 2 is a block diagram illustrating the configuration of the image processing apparatus 100. A control unit 110 includes a central processing unit (CPU) 111, a storage device 112, a printer interface (I/F) unit 113, a network I/F unit 114, a scanner I/F unit 115, and a display/operation I/F unit 116, which are communicably connected via a system bus 117. The control unit 110 controls the overall operation of the image processing apparatus 100. The CPU 111 functions as a unit to read out control programs stored in the storage device 112 and execute the control programs to execute each processing (such as reading control, image processing, and display control) illustrated in flowcharts to be described below. The storage device 112 stores and holds the above-described programs, image data, metadata, setting data, processing result data, and the like. Examples of the storage device 112 include a read-only memory (ROM) 118, which is a nonvolatile memory, a random access memory (RAM) 119, which is a volatile memory, and a hard disk drive (HDD) 120, which is a large-capacity storage area. The ROM 118 is a nonvolatile memory that holds control programs and the like. The CPU 111 reads out the control programs and executes reading control. The RAM 119 is a volatile memory that is used as a temporary storage area such as a main memory or a work area for the CPU 111. The network I/F unit 114 connects the control unit 110 to the LAN 102 via the system bus 117. The network I/F unit 114 transmits image data to an external apparatus on the LAN 102, and receives various information from the external apparatus on the LAN 102.

The scanner I/F unit 115 connects a scanner unit 122 and the control unit 110 via the system bus 117. The scanner unit 122 scans a document, generates scanned image data, and outputs the scanned image data to the control unit 110 via the scanner I/F unit 115. The scanner unit 122 includes a document feeder. The scanner unit 122 can feed a plurality documents placed on a tray one by one and consecutively scans the documents. The display/operation unit I/F unit 116 connects a display/operation unit 123 and the control unit 110 via the system bus 117. The display/operation unit 123 is provided with a liquid crystal display unit including a touch panel function, hardware buttons, and the like. The printer I/F unit 113 connects a printer unit 121 and the control unit 110 via the system bus 117. The printer unit 121 receives image data generated by the CPU 111 via the printer I/F unit 113, and uses the received image data to perform print processing on a recording sheet. As described above, in the image processing apparatus 100 according to the present exemplary embodiment, the image processing function can be provided by the above-described hardware configuration.

Processing Procedure Executed by Image
Processing Apparatus

An outline of processing according to the present exemplary embodiment is described below. Specifically, the image processing apparatus 100 scans a plurality of documents, and divides image data into a plurality of files based on a file division setting. A file name to be assigned to each file is generated using a character string of an OCR result on a top page of each file based on the index extraction rule, and a recommendation content is presented to the user through the display/operation unit 123. The user confirms whether the file name is appropriate and the recommendation is presented on the display/operation unit 123. If there is an error, the user issues a correction instruction. If there is a correction, the index extraction rule is updated based on a user's operation result. After the confirmation/correction processing on all the divided files is completed by the user, a file name is assigned to each file and the file is transmitted.

Next, a processing procedure to be executed by the image processing apparatus 100 according to the present exemplary embodiment will be described in detail with reference to a flowchart illustrated in FIG. 3. The CPU 111 of the image processing apparatus 100 functions as a processing unit that loads processing programs stored in the ROM 118 into the RAM 119, and executes the processing programs, to thereby executes processing of each step illustrated in FIG. 3.

In step S301, upon receiving a user's instruction from the display/operation unit 123, the image processing apparatus 100 causes the scanner unit 122 to scan a plurality of documents fed from the document feeder one by one, and obtains image data.

In step S302, the CPU 111 obtains a file division setting from the storage device 112. As the file division setting, a setting made based on a user's instruction received from the display/operation unit 123 may be preliminarily obtained, or a predetermined fixed setting may be obtained.

In step S303, the CPU 111 determines dividing positions of a plurality of pieces of image data obtained in step S301 based on the file division setting obtained in step S302. Further, the plurality of pieces of image data obtained in step S301 is divided into groups based on the dividing positions. Each of the groups is image data in one file when a file is created as described below, and one group includes at least one piece of image data. Accordingly, image data is divided to generate a plurality of files. An example of the file division setting and dividing position determination will be described below with reference to FIGS. 4A, 4B, and 4C.

In step S304, the CPU 111 starts confirmation/correction processing illustrated in step S309 in parallel, and then the processing proceeds to step S305.

Processing of step S309 is executed in parallel from the file which is subjected to the OCR-related processing in the following steps S305 to S307 and to which an unconfirmed attribute is assigned.

In step S305, the CPU 111 selects, in the order of scanning, one file which is not subjected to the OCR-related processing from among the image groups determined in step S303.

In step S306, the CPU 111 executes OCR-related processing on the image of the top page of the file selected in step S305. The OCR-related processing will be described in detail below.

In step S307, the CPU 111 assigns an unconfirmed attribute to the file which is selected in step S305 and which is subjected to the OCR-related processing in step S306. The term "unconfirmed attribute" refers to an attribute representing a waiting state of confirmation/correction processing started in parallel in step S304.

In step S308, the CPU 111 determines whether the OCR-related processing in step S306 on all image groups determined in step S303 is finished. If the OCR-related processing on all image groups is not finished, the processing returns to step S305. If the OCR-related processing on all image groups is finished, the processing proceeds to step S310.

On the other hand, in step S309 to be executed in parallel, the CPU 111 presents the file name to the user as the recommendation content for all image groups determined in step S303. After that, confirmation/correction processing for determining the file name based on a confirmation/correction instruction from the user is executed. The confirmation/correction processing will be described in detail below.

In step S310, the CPU 111 determines whether the confirmation/correction processing on all image groups determined in step S303 is finished. After waiting for completion of the confirmation/correction processing, if the confirmation/correction processing on all image groups is finished, the processing proceeds to step S311.

In step S311, the CPU 111 displays a list of file names determined after the confirmation/correction processing in step S309 on the display/operation unit 123.

In step S312, the CPU 111 creates a file from each of the image groups determined in step S303. The file name determined after the confirmation/correction processing by the user is assigned to each file in step S309. The present exemplary embodiment illustrates an example where a portable document format (PDF) file is created and the file is stored. In the case of a PDF file, an image can be stored as pages and the pieces of image data in the image groups determined in step S303 are stored as separate pages, respectively, in one file.

In step S313, the CPU 111 transmits the file created in step S312 to a transmission destination through the LAN 102.

Dividing Position Determination Processing

Figure 4A:
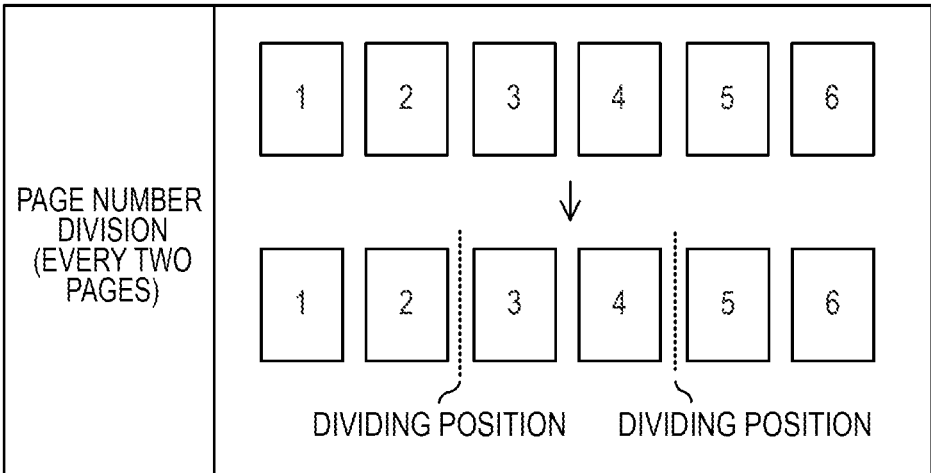
FIG. 4A illustrates an example of file dividing position determination processing according to the exemplary embodiment.
Figure 4B:
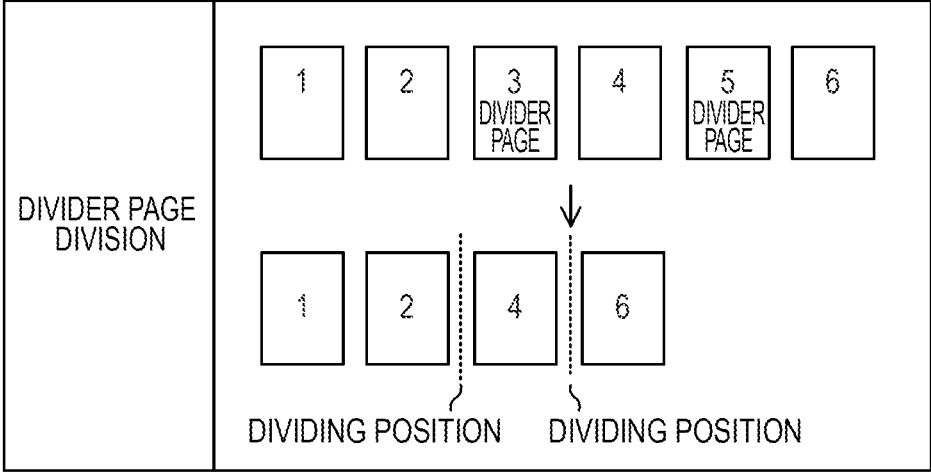
FIG. 4B illustrates an example of file dividing position determination processing according to the exemplary embodiment.
Figure 4C:
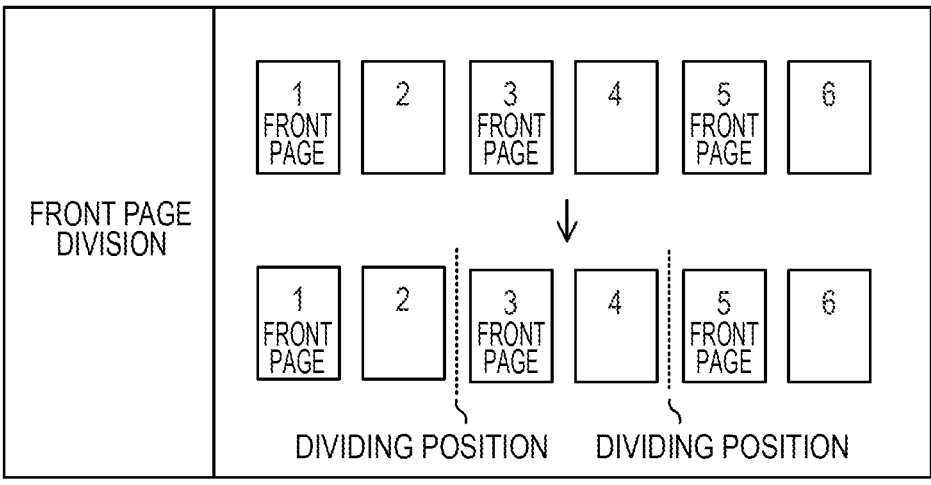
FIG. 4C illustrates an example of file dividing position determination processing according to the exemplary embodiment.

Next, the dividing position determination processing in step S303 will be described. FIGS. 4A, 4B, and 4C each illustrate image processing of page division processing for each file division setting.

FIG. 4A illustrates an example where a page number division setting is made as the file division setting. The term "page number division" refers to a method for determining a dividing position for each preset page number. The page number is, for example, instructed by the user on the display/operation unit 123, or the fixed page number is designated in advance based on the scanning setting. For example, when image data corresponding to six pages and the division setting of "every two pages" is made in step S301, the dividing position is set between the second page and the third page and between the fourth page and the fifth page.

FIG. 4B illustrates an example where a divider page division setting is made as the file division setting. The term "divider page division" refers to a method in which image data is analyzed and when the image data is recognized as a divider page, the divider page is removed and the dividing position is set at a position where the divider page is located. It may be desirable for the user to insert the divider page between documents to be divided and to set a document set on the document feeder. For example, when image data corresponding to six pages and the third and fifth pages are determined to be divider pages in step S301, image data on the third and fifth pages is removed. Further, the dividing position is set between the second page and the fourth page and between the fourth page and the sixth page. As the divider page, a blank sheet on which no image is printed, or a sheet on which a barcode or two-dimensional code is printed may be used. If a blank sheet is used as the divider page, the divider page is recognized by determining whether the page is a blank sheet by using, for example, the number of pixels which are included in the image data and have a certain pixel value or less, or information indicating whether a cluster of colored pixels having an area more than or equal to a certain area is included. In the case of using a sheet on which a barcode or two-dimensional code is printed, the barcode or two-dimensional code is first detected from the image data. Then, the divider page is recognized based on whether the result of decoding the detected barcode or two-dimensional code includes information for identifying the divider page. A sheet of a divider page using a barcode or two-dimensional code may be printed using a specific PC application. Alternatively, the number of sheets, the sheet size, or the like may be received from the display/operation unit 123 by using an application in the image processing apparatus 100, and the number of sheets, the sheet size, or the like may be printed by the printer unit 121.

FIG. 4C illustrates an example where a front page division setting is made as the file division setting. The term "front page division" refers to a method in which image data is analyzed and when the image data is recognized as a front page, the dividing position is set between the front page and the previous page. For example, when image data corresponding to six pages is obtained and the first, third, and fifth pages are recognized as the front page in step S301, the dividing position is set between the second page and the third page and between the fourth page and the fifth page. As a method for recognizing the front page, for example, image data on a front page is registered in advance and the front page is recognized based on comparison between images. Image data on a front page may be registered by scanning the document corresponding to the front page by the scanner unit 122 using an application in the image processing apparatus 100, or may be registered from the outside via the LAN 102 or the network I/F unit 114. In the comparison between images, it is recognized whether the front page is identical to the registered front page based on a degree of coincidence as a local feature amount calculated based on the images. The recognition of the front page is not limited to the comparison between images. Examples of other methods may include extracting a layout feature, such as a layout of characters or ruled lines included in a document within an image and the front page is recognized based on the comparison between layout features. Instead of registering the front page in advance, a method of recognizing the front page based on whether the front page includes a specific character string, barcode, or two-dimensional code.

OCR-Related Processing

Figure 5:
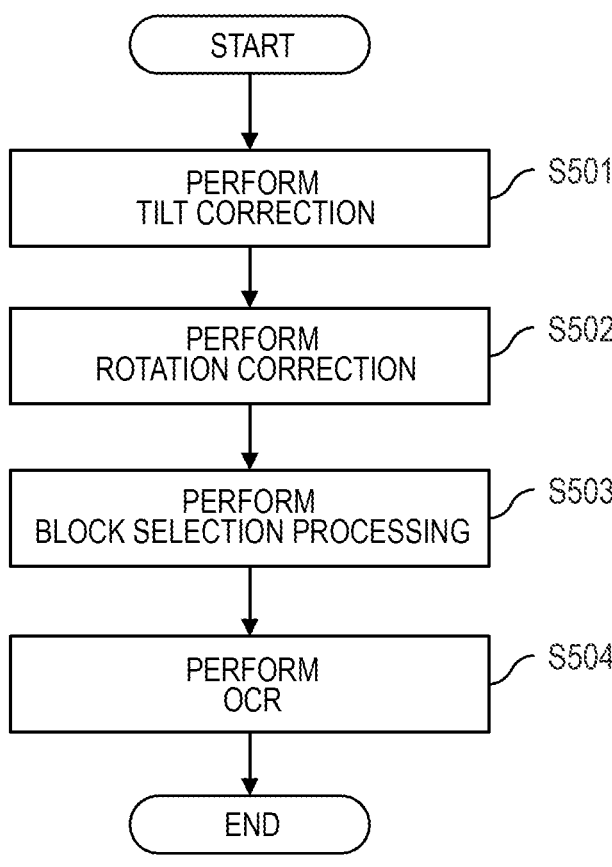
FIG. 5 is a flowchart illustrating a processing procedure of OCR related processing according to the exemplary embodiment.

Next, the OCR-related processing in step S306 will be described in detail with reference to FIG. 5. FIG. 5 is a flowchart illustrating a processing procedure for executing OCR-related processing including OCR and processing to be executed prior to OCR on one piece of image data.

In step S501, the CPU 111 detects a tilt angle from image data and rotates the image in an opposite direction by the amount corresponding to the detected tilt, thereby obtaining the image data with the corrected tilt.

In the tilt detection, objects included in image data are first detected and object groups adjacent in the horizontal direction or vertical direction are connected. Then, a tilt is obtained by obtaining the degree of inclination of an angle formed between central positions of the coupled objects from the horizontal direction or vertical direction. The tilt detection is not limited to the above-described method. For example, center coordinates of each object included in image data may be obtained and an angle with the highest ratio of the center coordinate group arranged in the horizontal direction or vertical direction may be obtained as a tilt, while the center coordinate group is rotated by 0.1 degrees. Correcting the tilt of the image by tilt correction leads to an increase in the processing accuracy of rotation correction, block selection processing, and OCR to be described below.

In step S502, the CPU 111 obtains an image by performing rotation correction on the image by 90 degrees so that characters in a document are directed to be erected with respect to the image obtained after the tilt correction in step S501. The image obtained after the tilt correction in step S501 is used as a reference image, and four images, i.e., the reference image, an image obtained by rotating the reference image by 90 degrees, an image obtained by rotating the reference image by 180 degrees, and an image obtained by rotating the reference image by 270 degrees, are prepared. Then, simple OCR processing capable of high-speed processing is executed on each image, and an image including the largest number of characters recognized with a degree of certainty of a certain value or more as the image obtained after the rotation correction. The rotation correction method is not limited to the above-described method.

In step S503, the CPU 111 executes block selection processing on the image obtained after the rotation correction in step S502. The block selection processing is determination processing in which an image is divided into a foreground area and a background area and the foreground area is divided into text blocks and blocks other than the text blocks.

Specifically, outline tracking is performed on a query image binarized into white and black, and a cluster of pixels surrounded by the outline of black pixels is extracted. As for a cluster of black pixels with an area larger than a predetermined area, a cluster of white pixels is extracted by performing outline tracking on white pixels located within the image, and a cluster of black pixels is recursively extracted from the inside of the cluster of white pixels with an area more than or equal to a certain area. The cluster of black pixels obtained as described above is used as a foreground area and is divided based on the size and shape thereof, and is divided into areas with different attributes. For example, pixels with an aspect ratio close to "1" and a size within a certain range are set as a cluster of pixels corresponding to a character, and a portion in which characters located close to each other are grouped in good order is set as a character area (TEXT). Further, a cluster of flat pixels is set as a line area (LINE). A range of a cluster of black pixels including a cluster of white pixels, which has a size greater than or equal to a certain size and has a rectangular shape, in good order is set as a table area (TABLE). An area in which a cluster of pixels with an infinite form is scattered is set as a photograph area (PHOTO). An area in which a cluster of pixels of any shape other than the above-described shapes is set as a picture area (PICTURE). Thus, a block determined to have a character attribute is identified as a text block from among blocks obtained by dividing an area for each object attribute.

Figure 6A:
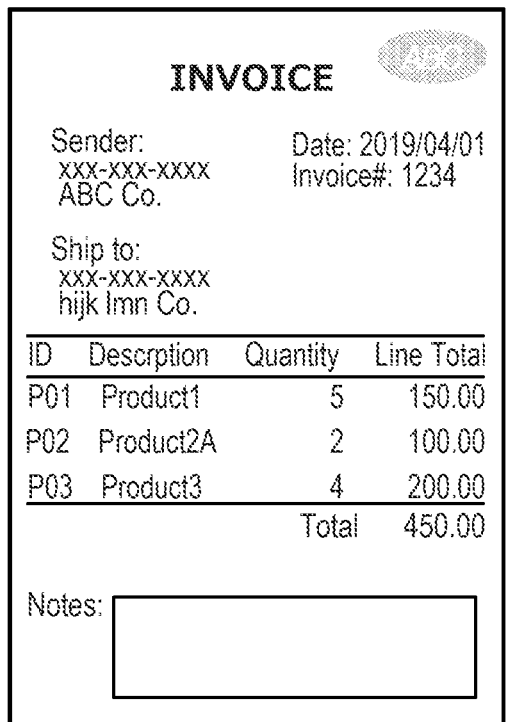
FIG. 6A illustrates an example of an image obtained after rotation correction according to the exemplary embodiment.
Figure 6B:
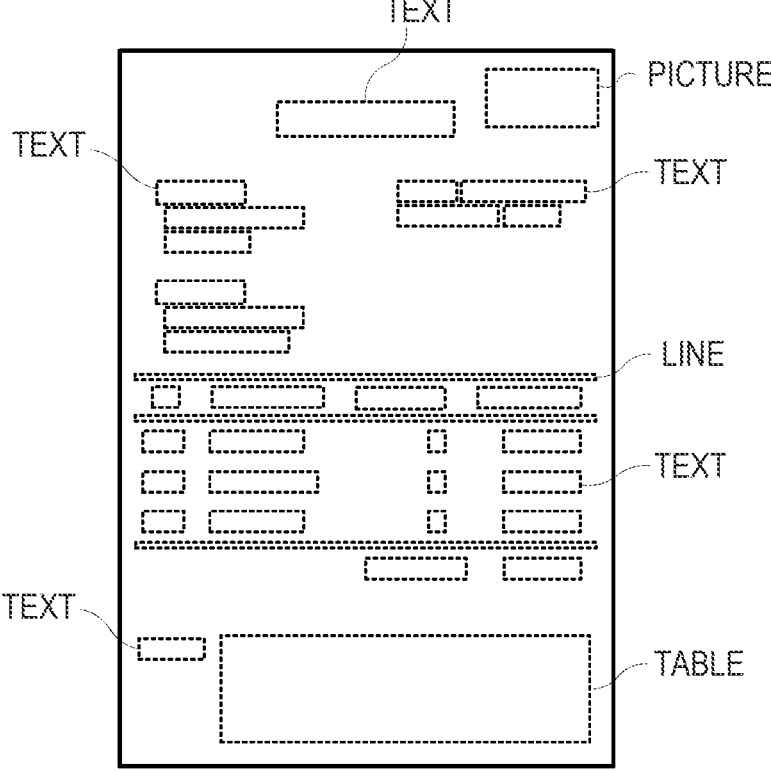
FIG. 6B illustrates an example of block selection processing according to the exemplary embodiment.

FIGS. 6A and 6B each illustrate an example of block selection processing results. FIG. 6A illustrates an image obtained after rotation correction. FIG. 6B illustrates a result of block selection processing on the query image. Information about each text block obtained in this step (information indicating an attribute and a position of each block) is used for OCR processing, similarity calculation, and the like to be described below. In this step, only text blocks are extracted. This is because the position of a character string accurately expresses the structure of a document image and is closely related to scanning assist information. Accordingly, it is not intended to exclude the use of information about blocks determined to have other attributes, such as the photograph area or the table area, for subsequent processing.

Referring again to the flowchart illustrated in FIG. 5, in step S504, the CPU 111 executes OCR processing on text blocks obtained in step S503, and obtains the character string corresponding to each text block as a result.

Confirmation/Correction Processing

Figure 7:
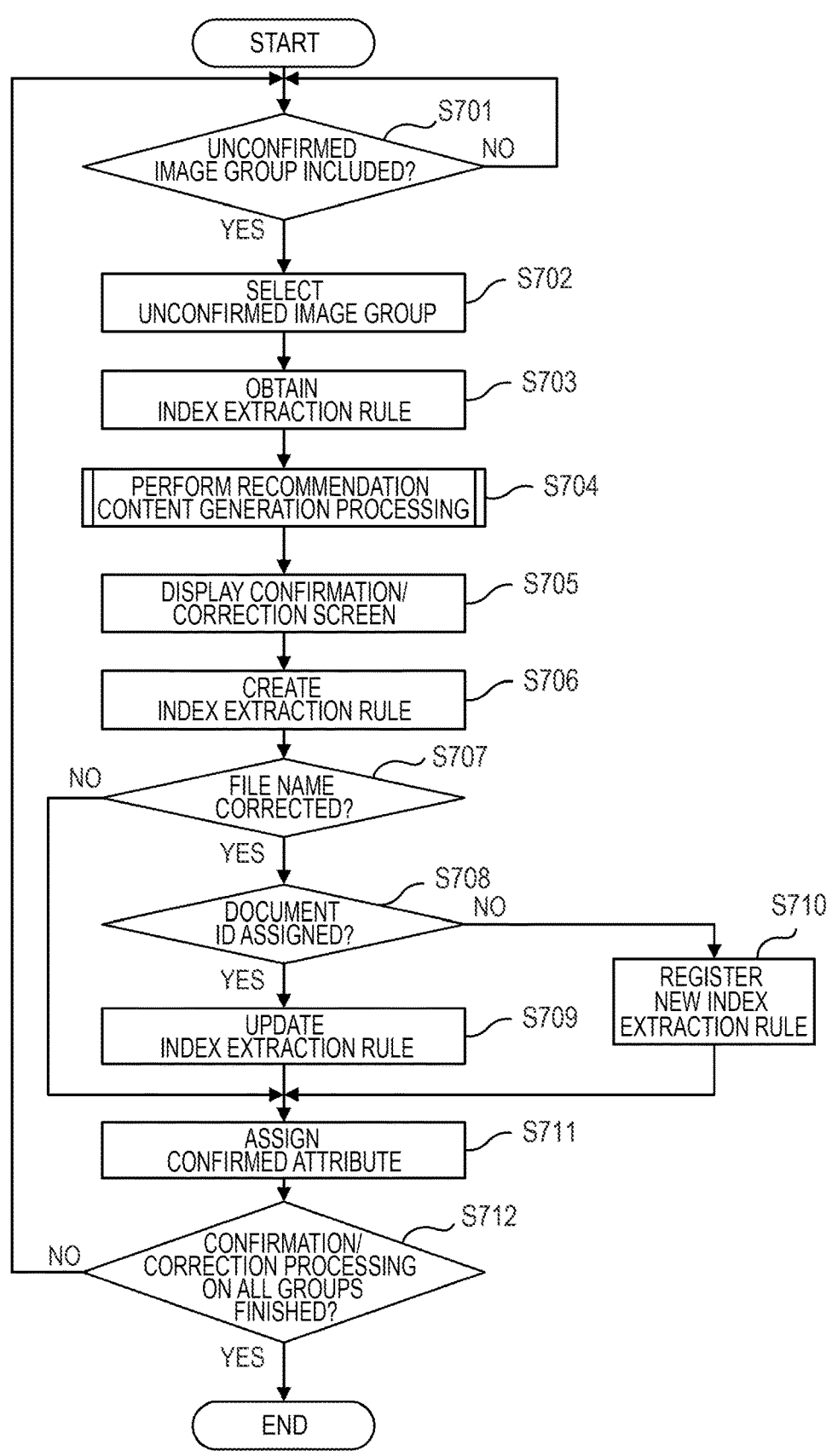
FIG. 7 is a flowchart illustrating confirmation/correction processing according to the exemplary embodiment.

Confirmation/correction processing (S309 illustrated in FIG. 3) will be described in detail. In the present exemplary embodiment, the confirmation/correction processing (S309) is started in step S304 illustrated in FIG. 3 and the processing flow (S305 to S308) illustrated in FIG. 3 is operated in parallel. The confirmation/correction processing is processing for presenting the recommendation content, to the user, a file name to be assigned to each of the divided files and determining the file name based on a user's instruction. FIG. 7 is a flowchart illustrating processing steps of confirmation/correction processing. FIGS. 8A, 8B, and 8C each illustrate image data on a top page of each image group. The image data illustrated in FIGS. 8A, 8B, and 8C are arranged in the order of scanning. FIGS. 8A and 8B illustrate documents of the same type. Some of the description contents of the documents are different. FIG. 8C illustrates documents of different types. A behavior of confirmation/correction processing when the image data illustrated in FIGS. 8A, 8B, and 8C is loaded will be described below with reference to a flowchart illustrated in FIG. 7.

Figure 3:
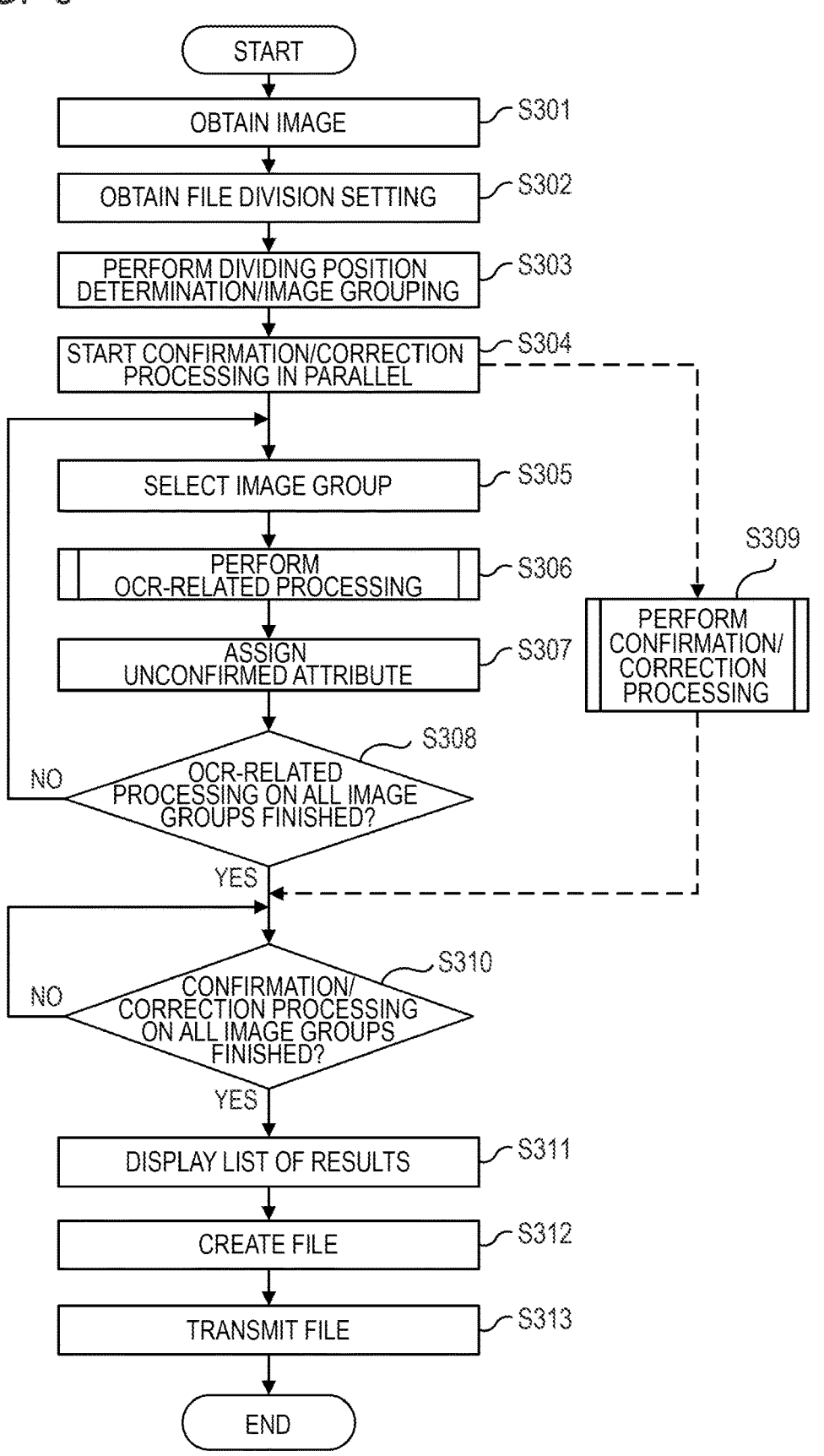
FIG. 3 is a flowchart illustrating an image processing procedure according to the exemplary embodiment.

In step S701, the CPU 111 confirms whether the image group which is obtained by scanning in step S301 illustrated in FIG. 3 and which is determined in step S303 includes a group to which an unconfirmed attribute is assigned. The term "unconfirmed attribute" refers to an attribute that is assigned in step S307 illustrated in FIG. 3 and indicates that the confirmation/correction processing has not been executed yet. If an image group to which an unconfirmed attribute is assigned is detected after waiting until the image group appears, the processing proceeds to step S702.

In step S702, the CPU 111 selects one image group to which the unconfirmed attribute is assigned in the order of scanning.

In step S703, the CPU 111 obtains the index extraction rule from the HDD 120 after the index extraction rule is loaded into the RAM 119. FIGS. 9A and 9B illustrate examples of the index extraction rule. FIG. 9A illustrates a state where one type of document with a document ID "0001" is registered. FIG. 9B illustrates a state where a document with a document ID "0002" is also registered. The index extraction rule is a set of a document ID, document identification information, and recommendation information for one registered document. A number of sets of a document ID, document identification information, and recommendation information corresponding to the number of registered documents are held. The document ID is a unique ID representing the type of a document. The document identification information is information for identifying the type of each document used for document matching to be described below. A text block group obtained by executing OCR-related processing is used. The recommendation information indicates a rule for extracting a recommendation content from an input document, and includes coordinates of a specific text block group within a registered document, and information about the order of OCR results of the text block group to be used for a file name. In the present exemplary embodiment, an example where a file name is recommended will be described in detail below. However, folder information about a file transmission destination, or information for assigning OCR results of a text block group as metadata may be held as the recommendation information. Further, as illustrated in FIGS. 9A and 9B, a thumbnail of scanned image data may be held together.

Figure 10:
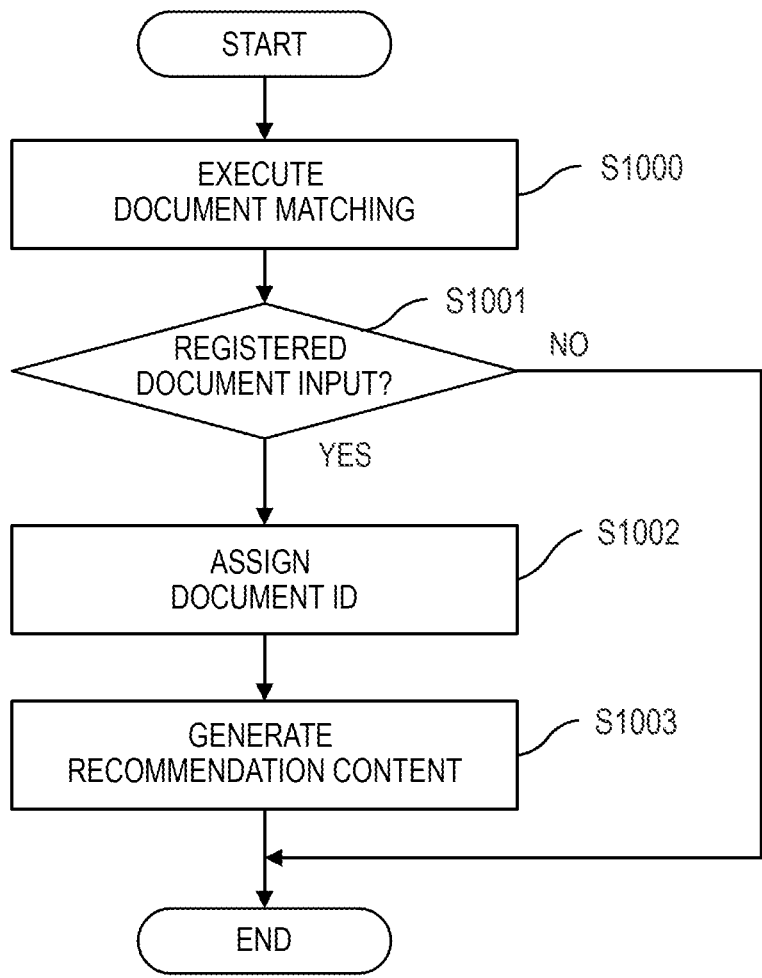
FIG. 10 is a flowchart illustrating recommendation content generation processing according to the exemplary embodiment.

In step S704, the CPU 111 executes recommendation content generation processing for generating a file name to be recommended for the image group selected in step S702 based on the index extraction rule obtained in step S703. FIG. 10 is a flowchart illustrating a processing procedure of recommendation content generation processing.

Recommendation Content Generation Processing

In step S1000, the CPU 111 executes document matching. The term "document matching" refers to processing in which it is determined whether a document of the same type as the input document is included in registered documents registered in a database of the image processing apparatus together with index extraction rules, and if there is a document of the same type, the type of the document is discriminated. In the present exemplary embodiment, first, a similarity indicating a degree of similarity in the shape or layout of text blocks obtained by OCR-related processing between the input document and each registered document on a one-to-one correspondence basis is calculated. In the similarity calculation, first, the entire text block of the input document is aligned with the entire text block of each registered document. Next, a value obtained by dividing the square of the sum total of areas where each text block in the input document overlaps the text block of the registered document by the product of the sum total of the text block area of the input document and the text block area of the registered document is set as a similarity. The calculation of the similarity described above is performed between the input document and all registered documents. If the highest similarity is more than or equal to a certain value, it is determined that the type of the input document is the same as the type of the registered document. If the highest similarity is smaller than the certain value, it is determined that the type of the input document does not match the type of each registered document. The document matching is not limited to the above-described method. For example, as document identification information, a character string group included in the document obtained as a result of OCR-related processing may be held and matching processing may be performed based on the similarity. Alternatively, image data or an image feature amount obtained from the image data may be held as document identification information, and the matching processing may be performed using the similarity between image feature amounts.

In step S1001, if the CPU 111 determines that the input document is a registered document as a result of document matching executed in step S1000, the processing proceeds to step S1002. If the input document is not a registered document, the processing is terminated.

In step S1002, the CPU 111 assigns the document ID, which is the same as the document ID assigned to the document determined to be the document of the same type in step S1000, to the input document.

In step S1003, the CPU 111 obtains recommendation information associated with the document ID of the document discriminated in step S1000 from the index extraction rule, and generates a file name as a recommendation content based on the rule. Specifically, first, a text block group for recommendation in the input document corresponding to a text block group for recommendation of a position set for each document type is obtained. In this case, the entire position of the image in the input document may be deviated from the entire position of the image in the registered document depending on a scanning timing, and the size of each text block may be changed in the description content. Accordingly, the entire text block of the input document is aligned with the entire text block of the registered document, and then a text block group for recommendation in the input document that overlaps a text block for recommendation in the registered document is obtained. Further, a result of connecting character strings obtained as a result of OCR processing on the obtained text block group for recommendation in the input document is recommended as a file name.

Confirmation/Correction Screen

Referring again to the flowchart illustrated in FIG. 7, in step S705 illustrated in FIG. 7, the CPU 111 displays a confirmation/correction screen on the operation/display unit 123. The confirmation/correction screen will be described with reference to FIGS. 11A, 11B, 11C, and 11D.

Referring to FIGS. 11A, 11B, 11C, and 11D, the display/operation unit 123 includes a touch panel display area 1101 and a hardware key 1102 (numeric keys, start keys for various processing, etc.). In the touch panel display area 1101, a preview image of image data obtained by scanning an input document is displayed. The user can scroll the preview image in any direction by performing a swipe operation on the preview image. In addition, a text field 1103 for displaying and editing a file name, a delete button 1104 for deleting a file name, and buttons 1105 and 1106 that enable scaling of a display magnification of the preview image are displayed. In addition, a button 1107 for cancelling the determination of a file name and returning to the previous file, and a button 1108 for determining a file name is displayed.

Figure 11A:
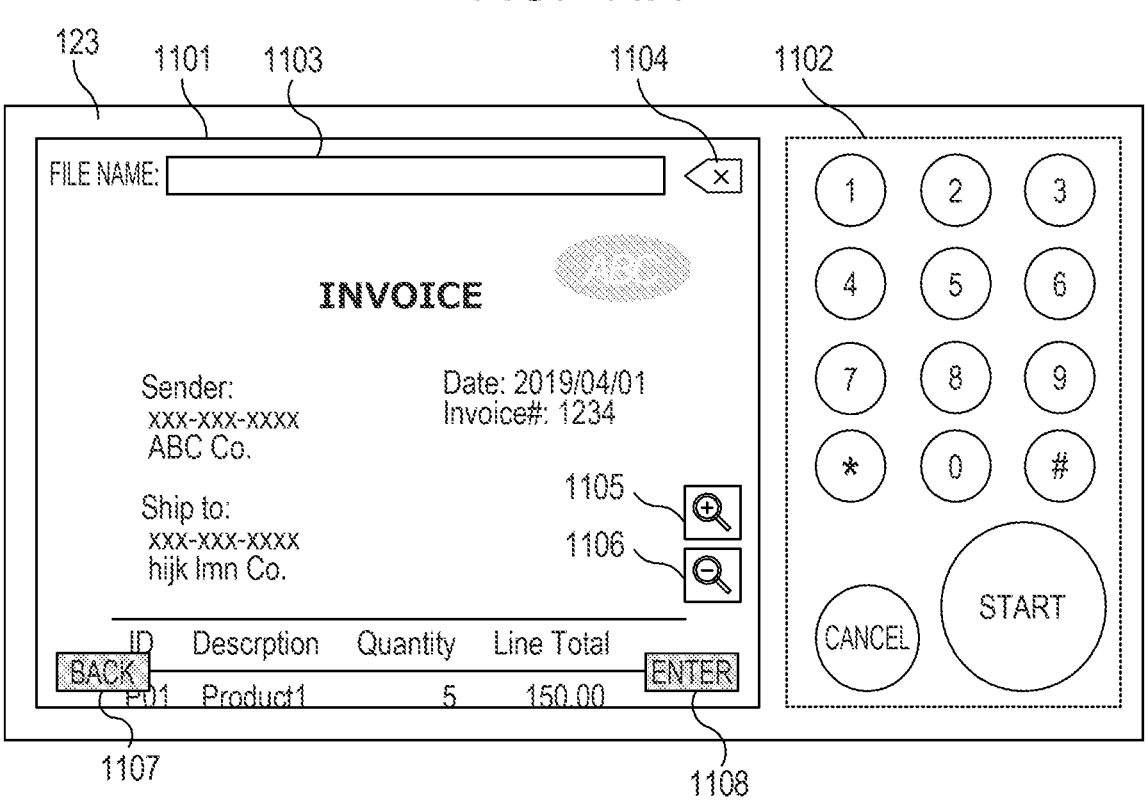
FIG. 11A illustrates an example of designation of a file name using a confirmation/correction screen according to the exemplary embodiment.
Figure 11B:
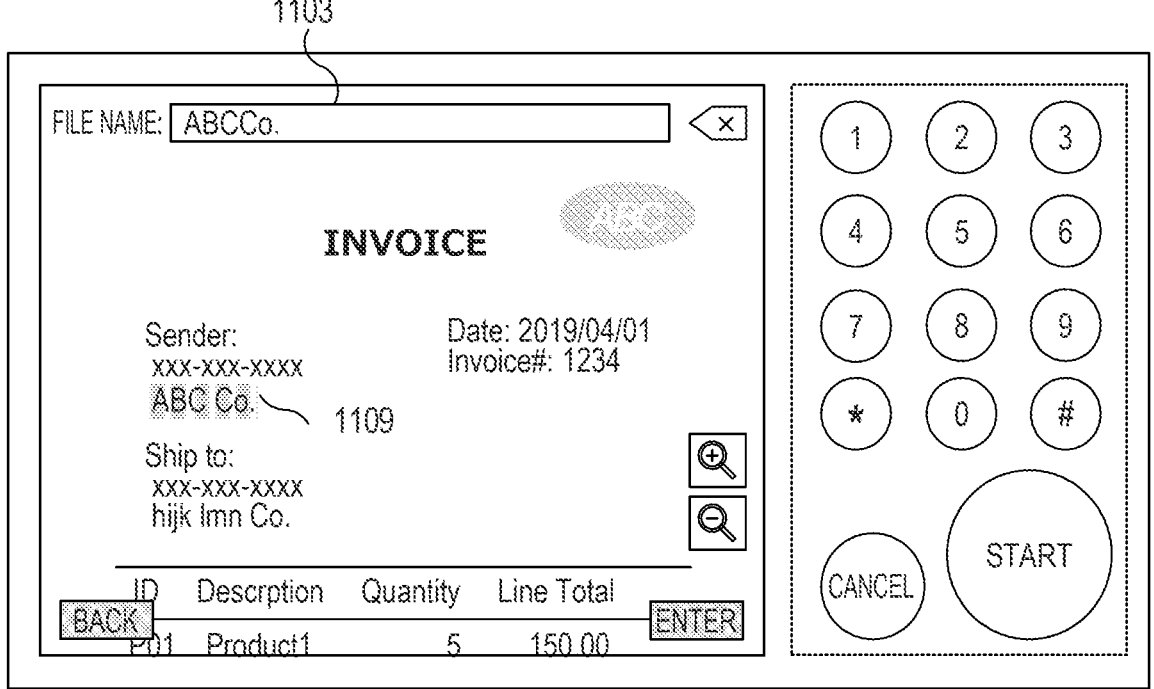
FIG. 11B illustrates an example of designation of a file name using the confirmation/correction screen according to the exemplary embodiment.
Figure 11C:
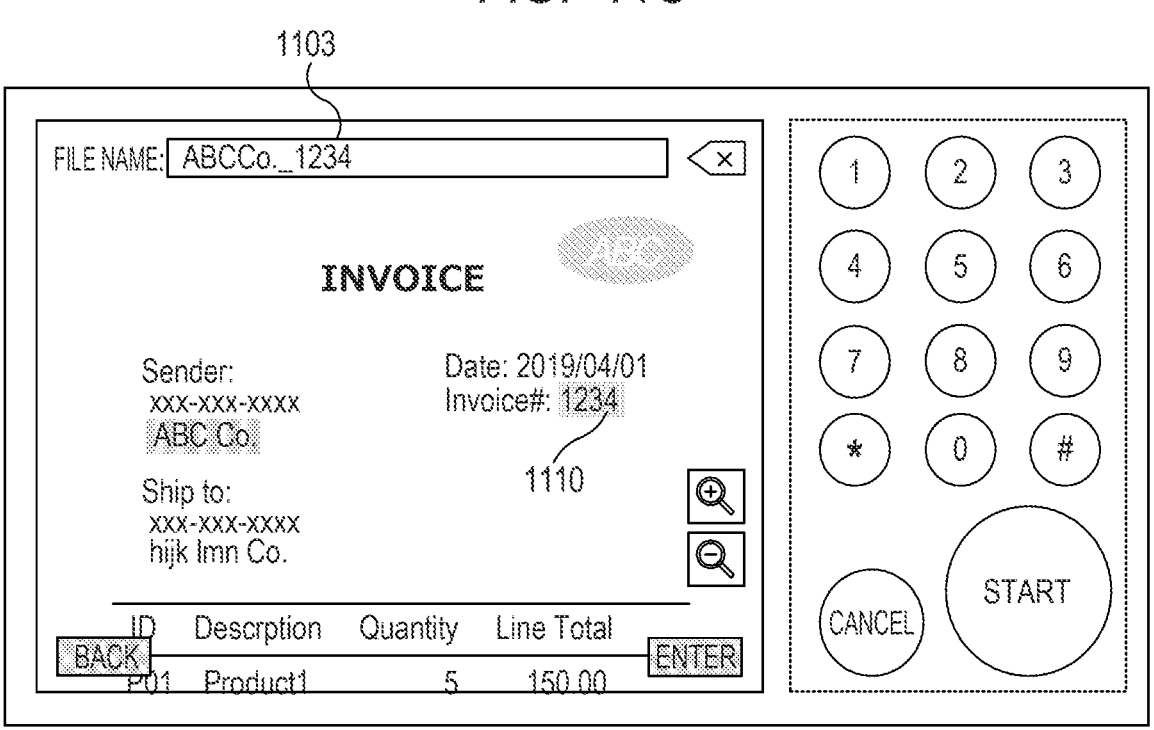
FIG. 11C illustrates an example of designation of a file name using the confirmation/correction screen according to the exemplary embodiment.
Figure 11D:
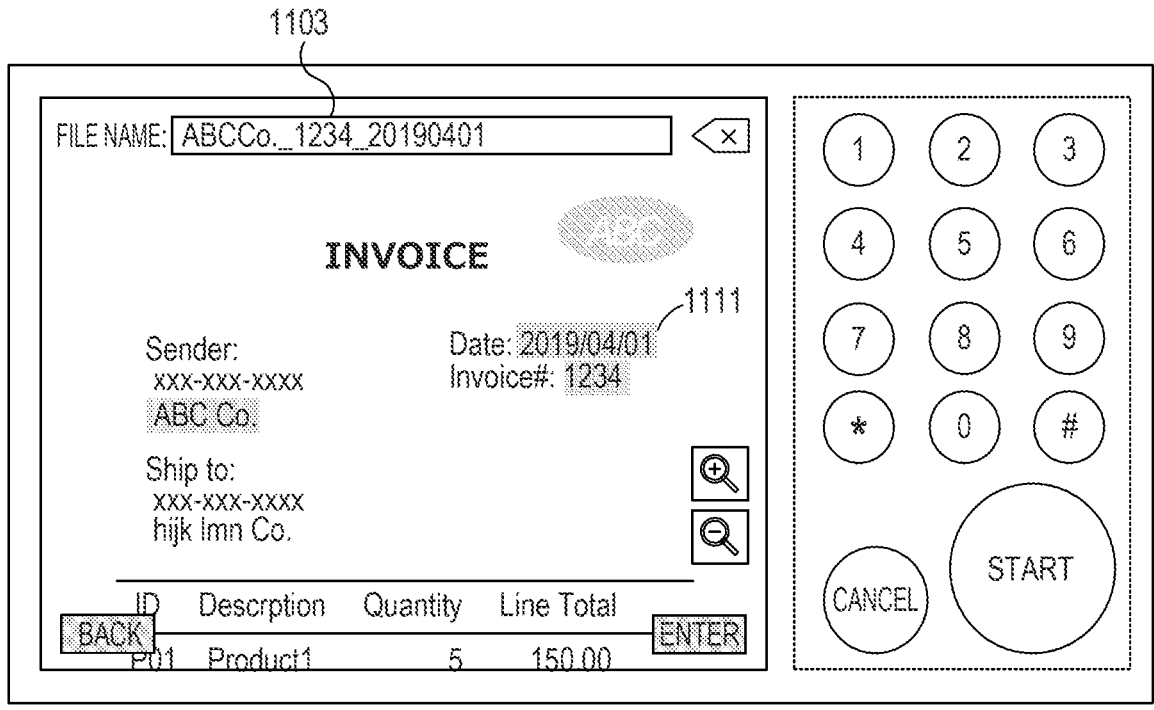
FIG. 11D illustrates an example of designation of a file name using the confirmation/correction screen according to the exemplary embodiment.

In this case, when the document illustrated in FIG. 8A is selected in step S702 and the index extraction rule illustrated in FIG. 9A is obtained in step S703, it is determined in step S704 that the selected document is an unregistered document. Accordingly, a file name is not generated as a recommendation content, and as illustrated in FIG. 11A, the text field 1103 for the file name is displayed as a blank area. The user touches the text block on the image data displayed as preview on the confirmation/correction screen, thereby enabling instruction of a file name to be assigned to a file. For example, as illustrated in FIG. 11B, when the user touches a text block 1109 indicating a transmission source company, the text block 1109 is highlighted on the preview. Then, in the text field 1103 for the file name, a text "ABCCo." is displayed as a result of OCR processing on the text block 1109. Similarly, FIG. 11C illustrates a result of touching a text block 1110 indicating a document number, and FIG. 11D illustrates a result of touching a text block 1111 indicating a date. In this manner, when a plurality of text blocks is touched, underscored results as predetermined separators are used as a file name.

On the other hand, in step S704, if a file name is generated as a recommendation content, the text block used for the file name is highlighted from the beginning as illustrated in FIG. 11D, and the confirmation/correction screen on which the file name is displayed is displayed. The text obtained as a result of OCR processing need not necessarily be used as the file name. For example, assume that, as illustrated in FIG. 11D, a text "2019/04/01" is obtained as a result of OCR processing on the text block 1111. This text data may be identified to be a YYYY/MM/DD format, which indicates a date, and may be converted into a YYYYMMDD format of "20190401". When the user presses the enter button 1108 to determine the file name, the processing proceeds to step S706.

In step S706, the CPU 111 creates the index extraction rule corresponding to the selected document based on the content instructed by the user on the confirmation/correction screen in step S705.

In step S707, the CPU 111 determines whether the file name generated in step S704 is corrected by the user in step S705. If the recommendation content is corrected, the processing proceeds to step S708. If the recommendation content is not corrected, the processing proceeds to step S711. If it is determined that the selected document is not a registered document in step S704, the processing proceeds to step S708, as in the case where the recommendation content is corrected.

In step S708, the CPU 111 determines whether a document ID is assigned to the selected image group. If a document ID is assigned to the selected image group, the processing proceeds to step S709. If a document ID is not assigned to the selected image group, the processing proceeds to step S710.

In step S709, the CPU 111 updates the document identification information of the corresponding document ID and the recommendation information based on the index extraction rule created in step S706. Then, the processing proceeds to step S711.

In step S710, the CPU 111 issues a new document ID and registers a new index extraction rule by combining the document identification information created in step S706 with the recommendation information. Then, the processing proceeds to step S711.

According to the above-described steps S706 to S708 and S710, when the user instructs a file name on the confirmation/correction screen (FIGS. 11B to 11D), the index extraction rule corresponding to the document ID "0002" illustrated in FIG. 9B is newly registered.

In step S711, the CPU 111 changes the attribute of the selected image group from the unconfirmed attribute to the confirmed attribute.

In step S712, the CPU 111 determines whether a confirmed attribute is assigned to all image groups determined in step S303. If a confirmed attribute is assigned to all image groups, the processing is terminated. If a confirmed attribute is not assigned to all image groups, the processing returns to step S701.

Figure 12A:
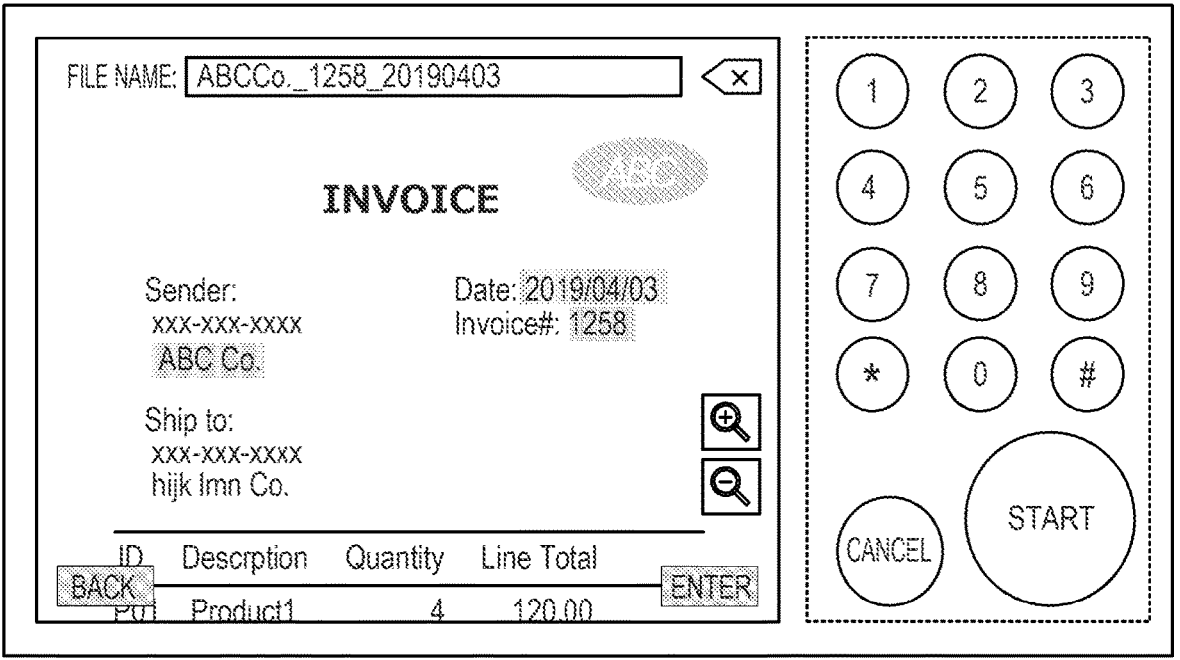
FIG. 12A illustrates an example of recommendation of a file name using the confirmation/correction screen according to the exemplary embodiment.

A case where images illustrated in FIGS. 8B and 8C are sequentially processed by the confirmation/correction processing described above will be described. First, when the document illustrated in FIG. 8B is selected in step S702, the updated index extraction rule illustrated in FIG. 9B is obtained in step S703. In step S704, it is determined that the document is a registered document (document ID "0002") and the file name is obtained as a recommendation result. In this case, FIG. 12A illustrates the confirmation/correction screen displayed in step S705. Thus, even when documents of the same type that are not registered before scanning are scanned at once, the user instructs a file name for one document on the confirmation/correction screen, thereby enabling recommendation of a file name for another document.

Figure 12B:
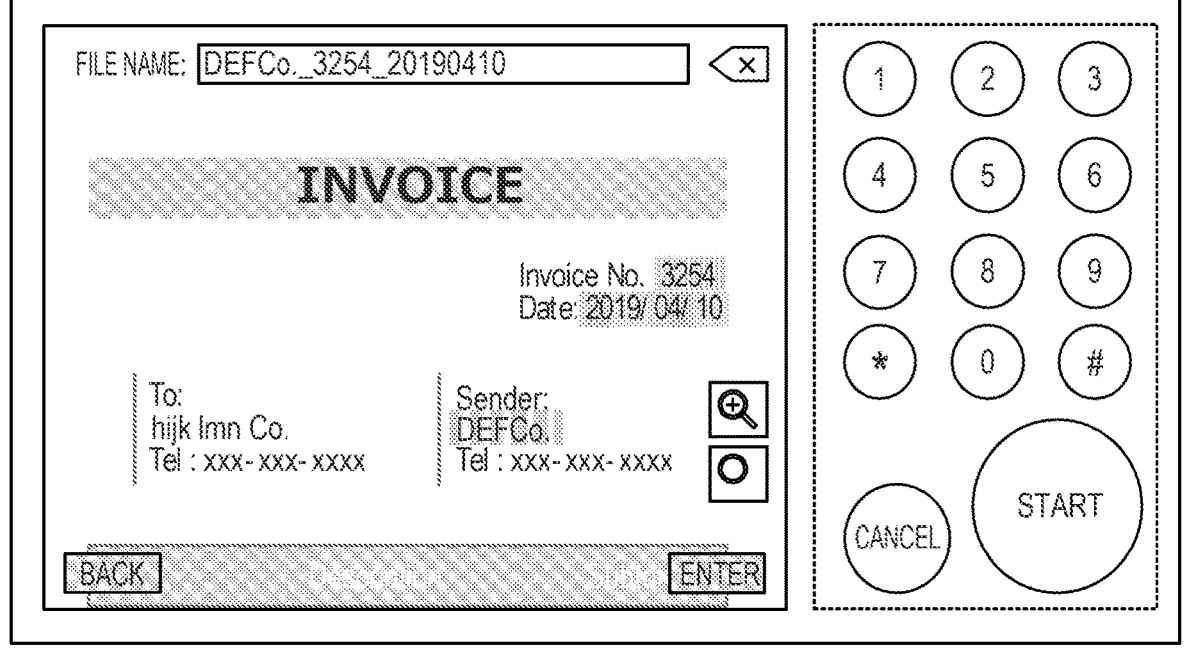
FIG. 12B illustrates an example of recommendation of a file name using the confirmation/correction screen according to the exemplary embodiment.

Next, a case where the document illustrated in FIG. 8C is selected in step S702 and the updated index extraction rule illustrated in FIG. 9B is obtained in step S703 will be described. In step S704, it is determined that the selected document is a registered document (document ID "0001"), and a file name is recommended based on the previously-registered index extraction rule. FIG. 12B illustrates the confirmation/correction screen displayed in step S705 in this case. In this manner, even when files of different types are scanned at once, the file name corresponding to the type of each document can be recommended based on the previously-registered index extraction rule.

According to the first exemplary embodiment described above, the function of file division obtained by scanning a plurality of documents, and recommending an index item, such as a file name, for each of the documents saves time and labor for the user. Even when documents of the same type are scanned within the same scanning process, rules that are registered and corrected on the spot can be applied. In addition, OCR-related processing to be preliminarily executed on all documents at a back end of confirmation/correction processing performed by the user enables a great reduction in waiting time for the user.

Second Exemplary Embodiment

The first exemplary embodiment illustrates an example where, at a back end of confirmation/correction processing, the OCR-related processing of step S306 illustrated in FIG. 3 is executed on all image groups, and the recommendation content generation processing of step S704 illustrated in FIG. 7 is executed prior to the display of each image group in the confirmation/correction screen. In a second exemplary embodiment, not only the OCR-related processing, but also recommendation content generation processing is executed at a back end of confirmation/correction processing. The second exemplary embodiment illustrates an example where it is determined whether it is necessary to regenerate a recommendation content before the confirmation/correction screen for each image group is displayed, and index extraction rule regeneration processing is executed only when the regeneration processing is required. Only differences between the second exemplary embodiment and the first exemplary embodiment will be described below.

FIG. 13 is a flowchart illustrating a processing procedure according to the present exemplary embodiment. Differences between the flowchart illustrated in FIG. 13 and the flowchart illustrated in FIG. 3 according to the first exemplary embodiment will now be described.

In step S304, the confirmation/correction processing is started in parallel, and then, in step S1301, the CPU 111 obtains the first index extraction rule from the HDD 120 after loading the first index extraction rule into the RAM 119. In the present exemplary embodiment, the first index extraction rule is loaded only once and applied once to each of the image groups divided in step S303. The first index extraction rule is an index extraction rule used for recommendation content generation processing in step S1302 to be described below.

In steps S305 to S306, the OCR-related processing is carried out and then, in step S1302, the CPU 111 executes recommendation content generation processing. In this case, the CPU 111 generates a file name to be recommended for the image group selected in step S305 based on the first index extraction rule obtained in step S1301. Details of the recommendation content generation processing are the same as the contents described in the first exemplary embodiment with reference to FIG. 10.

In the parallel processing of step S1303, the CPU 111 executes confirmation/correction processing for recommending a file name to the user and determining the file name based on the confirmation/correction instruction from the user for all the image groups divided in step S303. The confirmation/correction processing will be described in detail below.

Detailed Description of Confirmation/Correction
Processing

The confirmation/correction processing of step S1303 illustrated in FIG. 13 will be described in detail with reference to a flowchart illustrated in FIG. 14. In the present exemplary embodiment, the confirmation/correction processing is started in step S304 illustrated in FIG. 13, and is carried out in parallel with the processing flow illustrated in FIG. 13. Only differences between the flowchart illustrated in FIG. 14 and the flowchart illustrated in FIG. 7 according to the first exemplary embodiment will be described.

In step S1401, the CPU 111 creates a second index extraction rule and loads the created second index extraction rule into the RAM 119. The term "second index extraction rule" refers to an index extraction rule for temporarily holding an updated state in a case where the first index extraction rule obtained in step S1301 illustrated in FIG. 13 is updated or newly registered by confirmation/correction processing. The second index extraction rule includes not only the first index extraction rule, but also update information, which indicates whether the rule is updated or newly registered, as an attribute. In an initial state of the second index extraction rule, the document ID, document identification information, which are the contents of the first index extraction rule obtained in step S1301, match the recommendation information. Initial update information indicates "not updated". FIGS. 15A and 15B each illustrate an example of the second index extraction rule. FIG. 15A illustrates a state where recommendation information is generated based on the first index extraction rule in which the document type of the document ID "0001" is registered.

FIG. 15B illustrates a state where the index extraction rule corresponding to the document ID "0002" is newly registered.

In step S1402, the CPU 111 obtains the second index extraction rule loaded in the RAM 119.

In step S1403, the CPU 111 executes second recommendation content generation processing based on the second index extraction rule obtained in step S1402. The second recommendation content generation processing will be described in detail below.

After steps S705 and S706, if the second index extraction rule is corrected (S707) and the document ID is present (S708), the processing proceeds to step S1404. If the document ID is not present, the processing proceeds to S1405.

In step S1404, the CPU 111 updates the document identification information of the corresponding document ID and the recommendation information based on the second index extraction rule created in step S706, and holds the update information indicating "updated".

In step S1405, the CPU 111 issues a new document ID, combines the document ID with the document identification information and recommendation information created in step S706, newly registers the combined information in the second index extraction rule, and holds the updated state as new registration.

When the confirmation/correction processing on all groups is finished, in the subsequent step S1406, the CPU 111 reflects the second index extraction rule in the first index extraction rule, and stores the rule in the HDD 120.

Detailed Description of Second Recommendation Content Generation Processing

Figure 16:
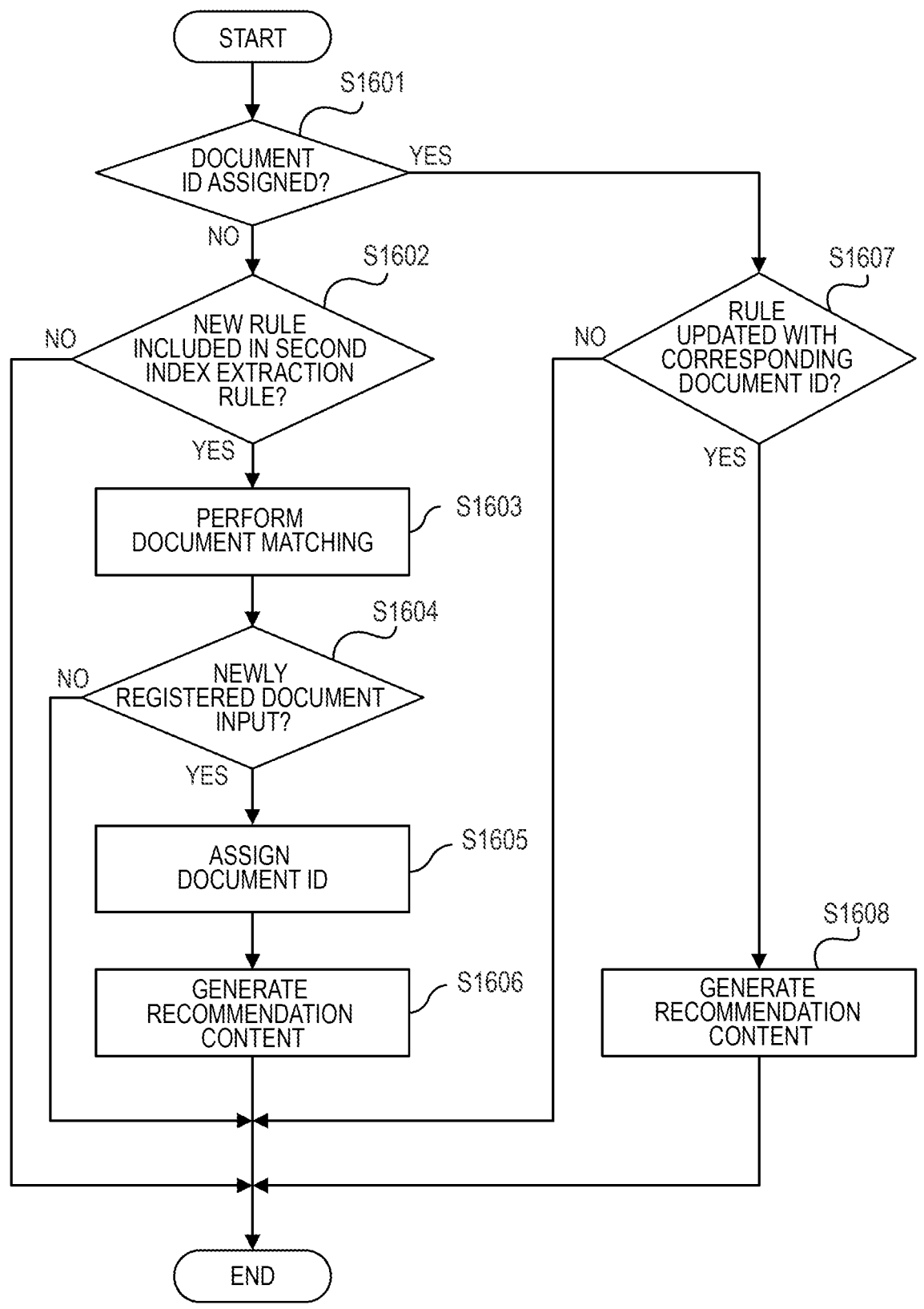
FIG. 16 is a flowchart illustrating recommendation content generation processing according to still more exemplary embodiment.

FIG. 16 is a flowchart illustrating second recommendation content generation processing.

Figure 14:
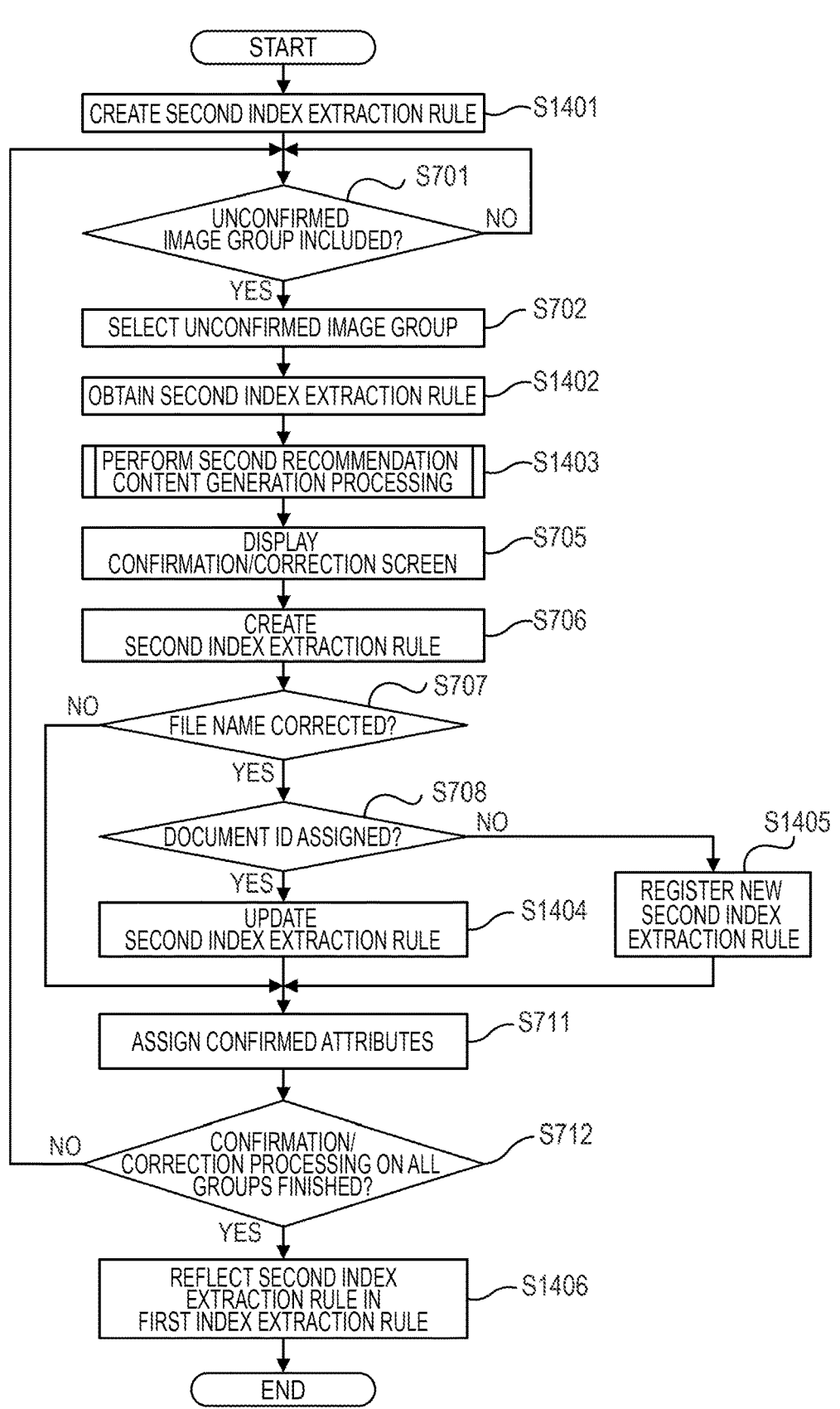
FIG. 14 is a flowchart illustrating confirmation/correction processing according to still another exemplary embodiment.

In step S1601, the CPU 111 determines whether the image group selected in step S702 illustrated in FIG. 14 is determined to be a registered document in the recommendation content generation processing of step S1302 illustrated in FIG. 13, and determines whether a document ID is assigned. If a document ID is not assigned, i.e., if the document image is not registered in the second index extraction rule, the processing proceeds to step S1602. If a document ID is assigned, the processing proceeds to step S1607.

In step S1602, the CPU 111 determines whether the second index extraction rule obtained in step S1402 illustrated in FIG. 14 includes a new rule as an attribute of update information. If the second index extraction rule includes a new rule, the processing proceeds step S1603. If the second index extraction rules do not include a new rule, the processing is terminated. Thus, if there is no new rule, the recommendation content generation processing results obtained in step S705 illustrated in FIG. 14 and in step S1302 illustrated in FIG. 13 are recommended, which leads to a reduction in time required for display of the confirmation/correction screen.

In step S1603, the CPU 111 executes document matching between the selected document and only the newly registered document in the second index extraction rule. In general, document matching increases a processing time depending on the number of registered documents to be matched. Accordingly, the processing time can be reduced by limiting the matching target only to newly registered documents.

In step S1604, if the CPU 111 determines that the input document is a newly registered document as a result of document matching executed in step S1603, the processing proceeds to step S1605. If it is determined that the input document is not a newly registered document, the processing is terminated. If the input document is not a newly registered document, the file name is not generated as the recommendation content and a user's instruction on the file name is received on the confirmation/display screen.

In step S1605, the CPU 111 assigns the document ID, which is the same document ID of the document determined to be the document of the same type, to the input document as a result of document matching in step S1603.

In the subsequent step S1606, the CPU 111 obtains recommendation information associated with the type of the document discriminated in step S1603 from the second index extraction rule, and generates a file name as a recommendation content based on the rule.

On the other hand, if a document ID is included in the image group, in step S1607, the CPU 111 refers to the update information of the second index extraction rule that is associated with the document ID assigned to the input document, and determines whether the rule is updated. If the rule is updated, the processing proceeds to step S1608. If the rule is not updated, the processing is terminated. Thus, if the rule is not updated, the recommendation content generation processing results obtained in step S705 illustrated in FIG. 14 and in step S1302 illustrated in FIG. 13 are recommended, which leads to a reduction time required for display of the confirmation/correction screen. Even when the rule is updated, there is no need to perform document matching and it is sufficient to generate the recommendation content in step S1608 to be described below, which leads to a reduction in time required for display of the confirmation/correction screen.

In step S1608, the CPU 111 obtains recommendation information associated with the document ID of the input document from the second index extraction rule, and generates a file name as a recommendation content based on the recommendation information.

According to the second exemplary embodiment described above, the recommendation content generation processing is preliminarily executed once on all documents at a back end of confirmation/correction processing performed by the user, and the recommendation content regeneration processing is performed as needed. Consequently, the time required for display of the confirmation/correction screen for each document can be reduced, which enables a further reduction in waiting time for the user, as compared with the first exemplary embodiment.

Other Embodiment

Embodiments of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-179738, filed Sep. 30, 2019, which is hereby incorporated by reference herein in its entirety.

What is claimed is:

1. A non-transitory computer-readable storage medium that stores a program to cause a computer to perform a method, the method comprising:

in response to scanning by a scanner of a sheet, executing an optical character recognition (OCR) on image data obtained by the scanning of the sheet; and providing a screen that includes a first character string obtained by the execution of the OCR on the image data and receives, from a user, an instruction of correcting the character string, wherein in response to a single instruction from a user, sheets on the scanner including the sheet and another sheet are scanned, and wherein the computer provides the screen while the OCR is executed on image data obtained by the scanning of the other sheet.

2. The non-transitory computer-readable storage medium according to claim 1, wherein the OCR is executed on the image data obtained by the scanning of the other sheet regardless of whether or not to receive a user operation on the screen.

3. The non-transitory computer-readable storage medium according to claim 1, wherein in response to a completion of the OCR on the image data obtained by the scanning of the sheet, the screen is provided.

4. The non-transitory computer-readable storage medium according to claim 1, wherein in response to a completion of the OCR on the image data obtained by the scanning of the sheet, the screen is provided while the OCR has not been executed on image data obtained by the scanning of at least one sheet included in the sheets.

5. The non-transitory computer-readable storage medium according to claim 1, wherein in response to a completion of the OCR on the image data obtained by the scanning of the sheet, the screen is provided before the OCR is completed on image data obtained by the scanning of remaining sheets included in the sheets.

6. The non-transitory computer-readable storage medium according to claim 1, wherein the screen is a UI screen and includes digital data.

7. The non-transitory computer-readable storage medium according to claim 1, wherein the screen is provided on a display of the computer.

8. The non-transitory computer-readable storage medium according to claim 1, wherein the screen is provided on a display of an apparatus different from the computer.

9. The non-transitory computer-readable storage medium according to claim 1, wherein the character string obtained by the execution of the OCR on the image data obtained by the scanning of the sheet and provided on the screen is a string indicating a file name of a file relating to the first image data, a string indicating a folder in which the file is stored, or a string indicating a result of the OCR.

10. The non-transitory computer-readable storage medium according to claim 1, wherein the screen includes the image data obtained by the scanning of the sheet besides the character string obtained by the execution of the OCR on the image data.

11. The non-transitory computer-readable storage medium according to claim 1, wherein the method further comprises:

managing, in association with a type of sheet, location information of a character area; and identifying, based on a result of image processing on the image data obtained by the scanning of the sheet, the type of sheet, wherein the character string obtained by the execution of the OCR on the character area in a location in the image data indicated by the location information managed in association with the type of sheet is included in the screen.

12. An information processing apparatus executing a program, the information processing apparatus comprising:

one or more memories; and one or more processors that is caused, by the program, to perform a method comprising:

in response to scanning by a scanner of a sheet, executing an optical character recognition (OCR) on image data obtained by the scanning of the sheet; and providing a screen that includes a character string obtained by the execution of the OCR on the image data and receives, from a user, an instruction of correcting the first character string, wherein in response to a single instruction from a user, sheets on the scanner including the sheet and another sheet are scanned, and wherein the information processing apparatus provides the screen while the OCR is executed on image data obtained by the scanning of the other sheet.

13. The information processing apparatus according to claim 12, wherein the OCR is executed on the image data obtained by the scanning of the other sheet regardless of whether or not to receive a user operation on the screen.

14. The information processing apparatus according to claim 12, wherein in response to a completion of the OCR on the image data obtained by the scanning of the sheet, the screen.

15. The information processing apparatus according to claim 12, wherein in response to a completion of the OCR on the image data obtained by the scanning of the sheet, the screen is provided while the OCR has not been executed on image data obtained by the scanning of at least one sheet included in the sheets.

16. The information processing apparatus according to claim 12, wherein in response to a completion of the OCR on the image data obtained by the scanning of the sheet, the screen is provided before the OCR is completed on image data obtained by the scanning of remaining sheets included in the sheets.

17. The information processing apparatus according to claim 12, wherein the screen is a UI screen and includes digital data.

18. The information processing apparatus according to claim 12, wherein the screen is provided on a display of the computer.

19. The information processing apparatus according to claim 12, wherein the screen is provided on a display of an apparatus different from the computer.

20. The information processing apparatus according to claim 12, wherein the character string obtained by the execution of the OCR on the image data obtained by the scanning of the sheet and provided on the screen is a string indicating a file name of a file relating to the image data, a string indicating a folder in which the file is stored, or a string indicating a result of the OCR.

21. The information processing apparatus according to claim 12, wherein the screen includes the image data obtained by the scanning of the sheet besides the character string obtained by the execution of the OCR on the image data.

22. The information processing apparatus according to claim 12, wherein the method further comprises:

managing, in association with a type of sheet, location information of a character area; and identifying, based on a result of image processing on the image data obtained by the scanning of the sheet, the type of sheet, wherein the character string obtained by the execution of the OCR on the character area in a location in the image data indicated by the location information managed in association with the type of sheet is included in the screen.

23. A method of controlling an information processing apparatus and being caused by a program to be executed, the method comprising:

in response to scanning by a scanner of a sheet, executing an optical character recognition (OCR) on image data obtained by the scanning of the sheet; and providing a screen that includes a first character string obtained by the execution of the OCR on the image data and receives, from a user, an instruction of correcting the character string, wherein in response to a single instruction from a user, sheets on the scanner including the sheet and another sheet are scanned, and wherein the information processing apparatus provides the screen while the OCR is executed on image data obtained by the scanning of the other sheet.

24. The method according to claim 23, wherein the OCR is executed on the image data obtained by the scanning of the other sheet regardless of whether or not to receive a user operation on the screen.

25. The method according to claim 23, wherein in response to a completion of the OCR on the image data obtained by the scanning of the sheet, the screen is provided.

26. The method according to claim 23, wherein in response to a completion of the OCR on the image data obtained by the scanning of the sheet, the screen is provided while the OCR has not been executed on image data obtained by the scanning of at least one sheet included in the sheets.

27. The method according to claim 23, wherein in response to a completion of the OCR on the image data obtained by the scanning of the sheet, the screen is provided before the OCR is completed on image data obtained by the scanning of remaining sheets included in the sheets.

28. The method according to claim 23, wherein the screen is a UI screen and includes digital data.

29. The method according to claim 23, wherein the screen is provided on a display of the computer.

30. The method according to claim 23, wherein the screen is provided on a display of an apparatus different from the computer.

31. The method according to claim 23, wherein the character string obtained by the execution of the OCR on the image data obtained by the scanning of the sheet and provided on the screen is a string indicating a file name of a file relating to the image data, a string indicating a folder in which the file is stored, or a string indicating a result of the OCR.

32. The method according to claim 23, wherein the screen includes the image data obtained by the scanning of the sheet besides the character string obtained by the execution of the OCR on the image data.

33. The method according to claim 23, wherein the method further comprises:

managing, in association with a type of sheet, location information of a character area; and identifying, based on a result of image processing on the image data obtained by the scanning of the sheet, the type of sheet, wherein the character string obtained by the execution of the OCR on the character area in a location in the image data indicated by the location information managed in association with the type of sheet is included in the screen.

34. A system comprising:

a scanner configured to scan a sheet;

one or more computers configured to execute one or more programs, the one or more computers configured to:

in response to the scanning by the scanner of the sheet, execute an optical character recognition (OCR) on image data obtained by the scanning of the sheet; and provide a screen that includes a character string obtained by the execution of the OCR on the image data and receives, from a user, an instruction of correcting the character string, wherein the scanner is configured to scan, in response to a single instruction from a user, sheets on the scanner including the sheet and another sheet, and wherein one of the one or more computers provide the screen while the OCR is executed on image data obtained by the scanning of the other sheet.

35. The system according to claim 34, wherein the OCR is executed on the image data obtained by the scanning of the other sheet regardless of whether or not to receive a user operation on the screen.

36. The system according to claim 34, in response to a completion of the OCR on the image data obtained by the scanning of the sheet, the screen is provided.

37. The system according to claim 34, in response to a completion of the OCR on the image data obtained by the scanning of the sheet, the screen is provided while the OCR has not been executed on image data obtained by the scanning of at least one sheet included in the sheets.

38. The system according to claim 34, in response to a completion of the OCR on the image data obtained by the scanning of the sheet, the screen is provided before the OCR is completed on image data obtained by the scanning of remaining sheets included in the sheets.

39. The system according to claim 34, wherein the screen is a UI screen and includes digital data.

40. The system according to claim 34, wherein the screen is provided on a display of the one of the one or more computers.

41. The system according to claim 34, wherein the screen is provided on a display of an apparatus different from the one of the one or more computers.

42. The system according to claim 34, wherein the character string obtained by the execution of the OCR on the image data obtained by the scanning of the sheet and provided on the screen is a string indicating a file name of a file relating to the image data, a string indicating a folder in which the file is stored, or a string indicating a result of the OCR.

43. The system according to claim 34, wherein the screen includes the image data obtained by the scanning of the sheet besides the character string obtained by the execution of the OCR on the image data.

44. The system according to claim 34, wherein the one or more computers further configured to:

manage, in association with a type of sheet, location information of a character area; and identify, based on a result of image processing on the image data obtained by the scanning of the sheet, the type of sheet, wherein the character string obtained by the execution of the OCR on the character area in a location in the image data indicated by the location information managed in association with the type of sheet is included in the screen.

* * * * *